United States Patent
Fujii et al.

(10) Patent No.: US 11,014,239 B2
(45) Date of Patent: May 25, 2021

(54) INTERFERENCE DETERMINATION METHOD, INTERFERENCE DETERMINATION SYSTEM, AND COMPUTER PROGRAM

(71) Applicant: OMRON Corporation, Kyoto (JP)

(72) Inventors: Haruka Fujii, Uji (JP); Akane Nakashima, Nara (JP); Takeshi Kojima, Kyoto (JP); Kennosuke Hayashi, Kizugawa (JP)

(73) Assignee: OMRON Corporation, Kyoto (JP)

( * ) Notice: Subject to any disclaimer, the term of this patent is extended or adjusted under 35 U.S.C. 154(b) by 465 days.

(21) Appl. No.: 16/011,714

(22) Filed: Jun. 19, 2018

(65) Prior Publication Data

US 2019/0039242 A1 Feb. 7, 2019

(30) Foreign Application Priority Data

Aug. 2, 2017 (JP) .............................. JP2017-149870

(51) Int. Cl.
 *G05B 19/04* (2006.01)
 *G05B 19/18* (2006.01)
 (Continued)

(52) U.S. Cl.
 CPC ............ *B25J 9/1666* (2013.01); *G05B 19/19* (2013.01); *B25J 9/1605* (2013.01); *B25J 9/1676* (2013.01);
 (Continued)

(58) Field of Classification Search
 CPC ...... B25J 9/1605; B25J 9/1666; B25J 9/1676; B25J 9/06; B25J 9/1664; G05B 19/19;
 (Continued)

(56) References Cited

U.S. PATENT DOCUMENTS

| | | | |
|---|---|---|---|
| 6,452,604 B1 * | 9/2002 | Sato | G06T 17/00 345/619 |
| 8,855,815 B2 * | 10/2014 | Mizutani | G05B 19/423 700/245 |

(Continued)

FOREIGN PATENT DOCUMENTS

| | | |
|---|---|---|
| EP | 0412619 A2 | 2/1991 |
| JP | H11-328233 A | 11/1999 |

(Continued)

OTHER PUBLICATIONS

The extended European search report dated Mar. 20, 2019 in a counterpart European patent application.

(Continued)

*Primary Examiner* — Harry Y Oh
(74) *Attorney, Agent, or Firm* — Metrolex IP Law Group, PLLC

(57) ABSTRACT

Provided is an interference determination method with which whether or not a robot interferes with a surrounding object on a motion path can be computed. At least one intermediate position is set on a motion path of movement from the first position to the second position, a plurality of robot approximated bodies that are each constituted by combining at least two robot approximated bodies at a plurality of postures corresponding to each position are generated, a second combined approximated body constituted by combining at least two first combined approximated bodies is generated with respect to at least one focused part, and the second combined approximated body interferes with a surrounding object approximated body is determined.

19 Claims, 24 Drawing Sheets

(51) Int. Cl.
*B25J 9/16* (2006.01)
*G05B 19/19* (2006.01)
*G05B 19/4061* (2006.01)

(52) U.S. Cl.
CPC .............. *G05B 19/4061* (2013.01); *G05B 2219/39094* (2013.01)

(58) Field of Classification Search
CPC ...... G05B 19/4061; G05B 2219/39094; G05B 2219/39135; G05B 2219/40442; G05B 2219/40477; G05B 2219/40492; H01L 21/68707
See application file for complete search history.

(56) References Cited

U.S. PATENT DOCUMENTS

| | | | | |
|---|---|---|---|---|
| 10,303,180 | B1* | 5/2019 | Prats | G05D 1/0246 |
| 2006/0176001 | A1 | 8/2006 | Haunerdinger | |
| 2007/0299642 | A1* | 12/2007 | Kondo | G06F 30/20 |
| | | | | 703/6 |
| 2009/0326711 | A1* | 12/2009 | Chang | B25J 9/1666 |
| | | | | 700/248 |
| 2010/0168950 | A1* | 7/2010 | Nagano | B25J 9/1666 |
| | | | | 701/25 |
| 2012/0215351 | A1* | 8/2012 | McGee | B25J 9/1666 |
| | | | | 700/248 |
| 2012/0265342 | A1 | 10/2012 | Kumiya et al. | |
| 2014/0025203 | A1* | 1/2014 | Inazumi | B25J 9/1666 |
| | | | | 700/255 |
| 2016/0288318 | A1* | 10/2016 | Nakazato | B25J 9/1666 |
| 2017/0235301 | A1* | 8/2017 | Atohira | G05B 19/42 |
| | | | | 700/254 |
| 2017/0274528 | A1* | 9/2017 | Inaba | B25J 9/163 |
| 2017/0348856 | A1* | 12/2017 | Nakaya | B25J 9/1664 |

FOREIGN PATENT DOCUMENTS

| | | |
|---|---|---|
| JP | 2010-155328 A | 7/2010 |
| JP | 2012-223845 A | 11/2012 |
| JP | 2014-21810 A | 2/2014 |
| JP | 2014-73550 A | 4/2014 |

OTHER PUBLICATIONS

The Office Action (JPOA) dated Feb. 2, 2021 in a counterpart Japanese patent application.

* cited by examiner

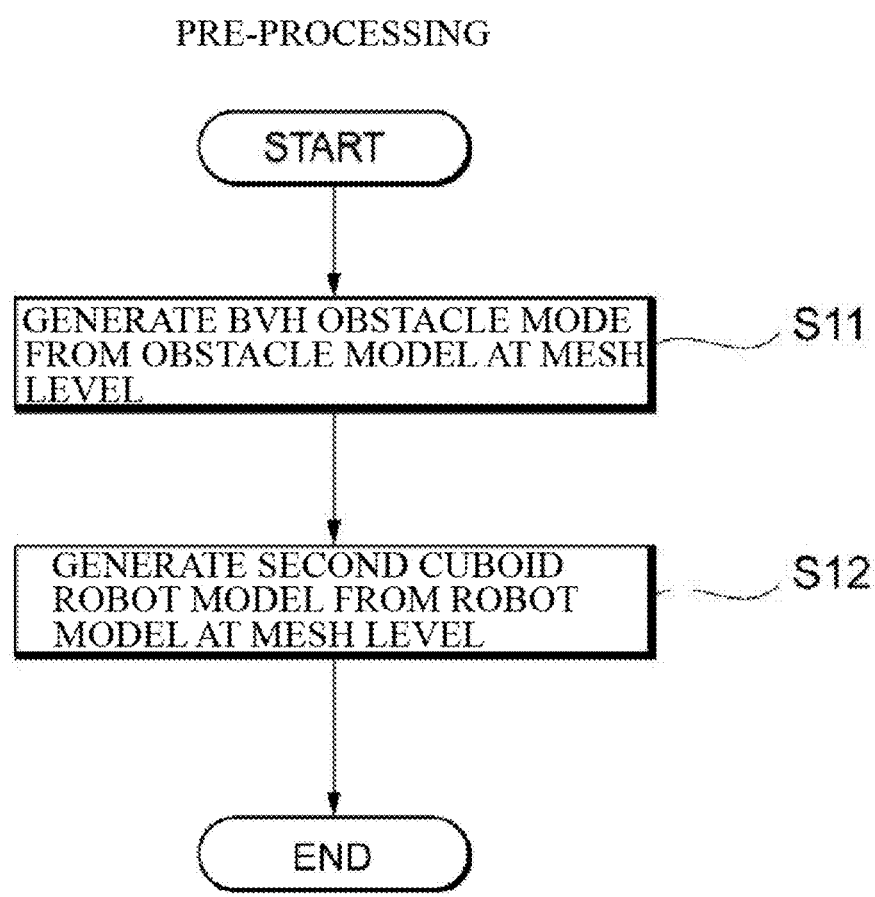

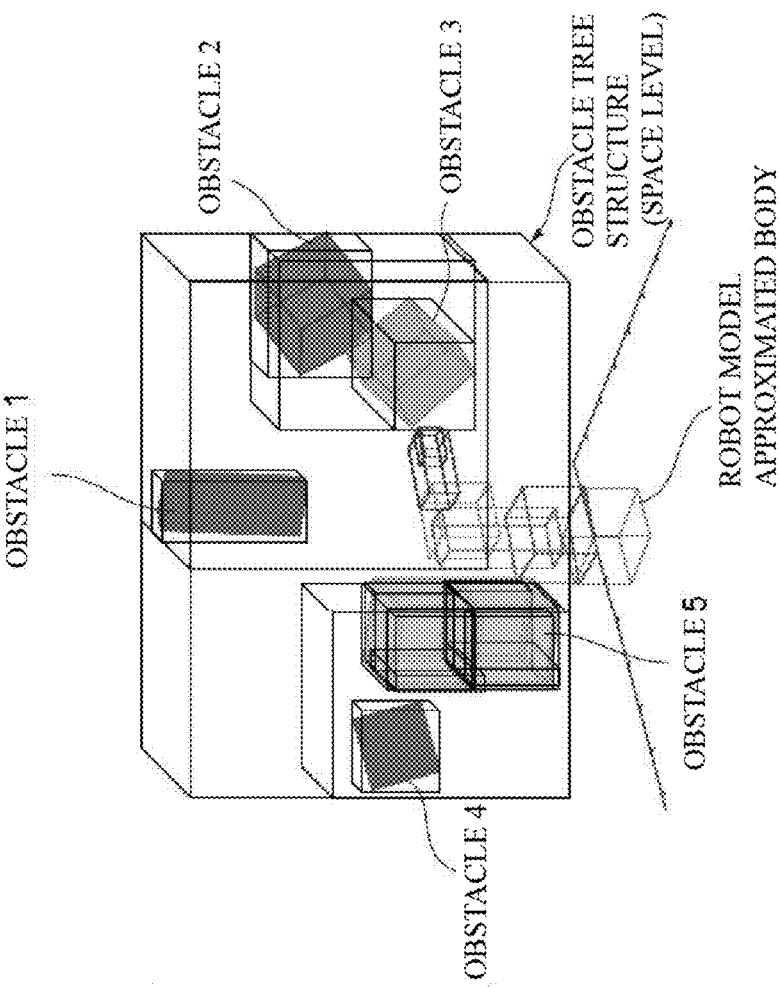
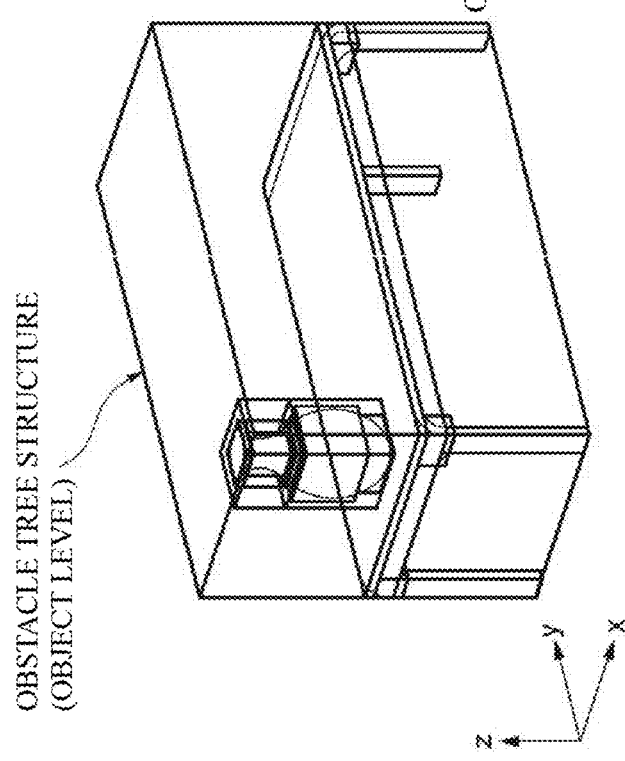

LINK 50

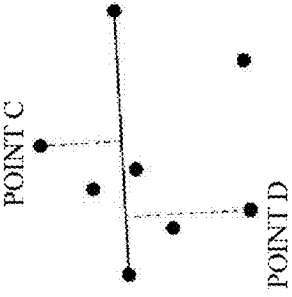
FIG. 19A
FIG. 19B
FIG. 19C
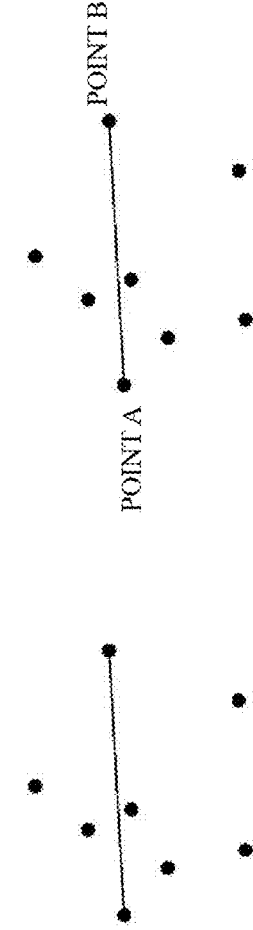
FIG. 19D
FIG. 19E
FIG. 19F

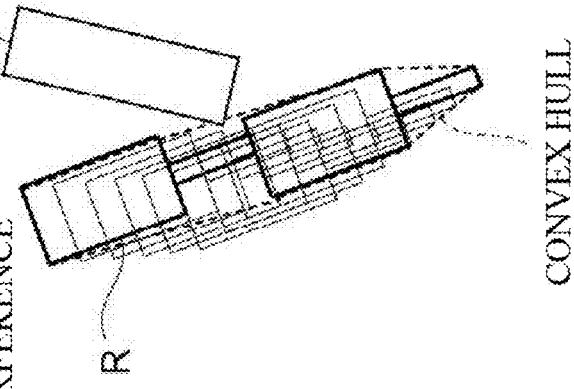
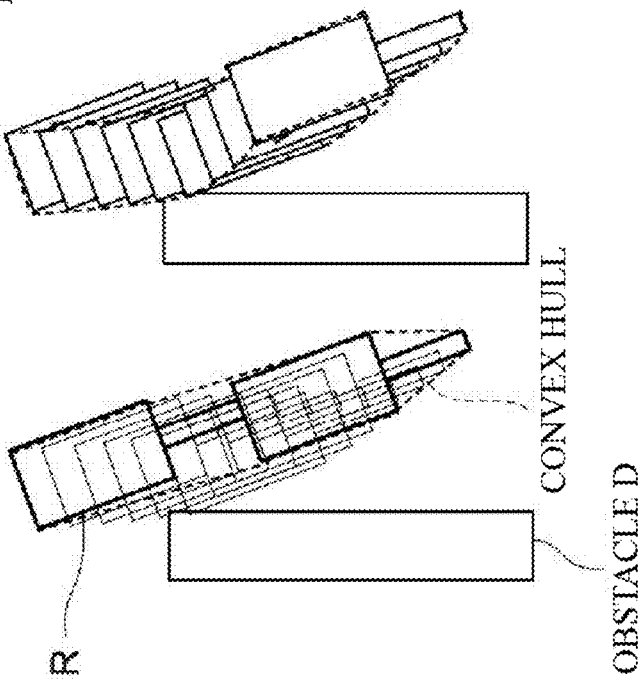

[ACTUALITY] INTERFERENCE
[DETERMINATION] INTERFERENCE

MIS-DETERMINATION CASE
[ACTUALITY] NO-INTERFERENCE
[DETERMINATION] INTERFERENCE

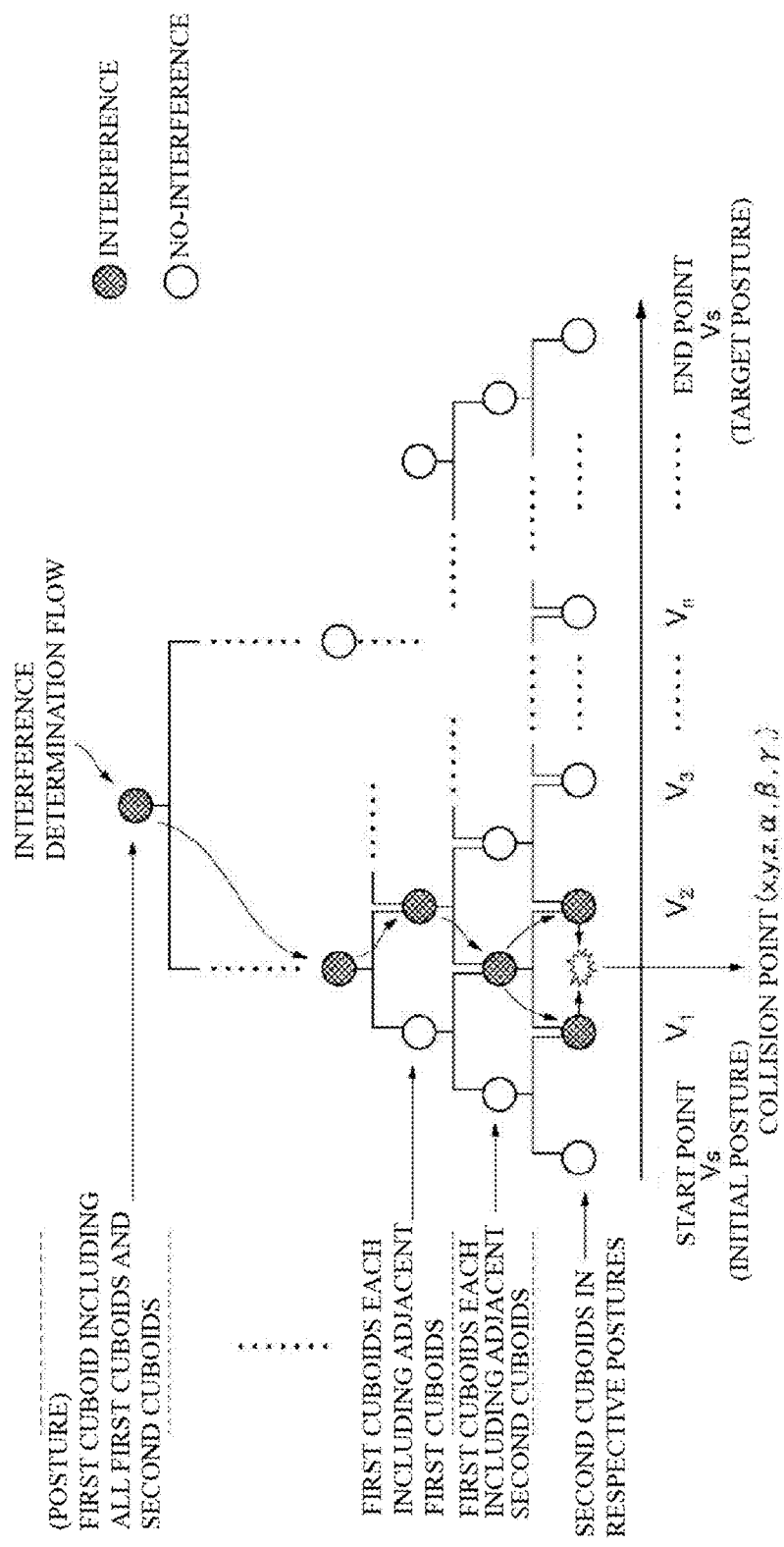

INTERFERENCE DETERMINATION METHOD, INTERFERENCE DETERMINATION SYSTEM, AND COMPUTER PROGRAM

CROSS-REFERENCES TO RELATED APPLICATIONS

This application claims priority to Japanese Patent Application No. 2017-149870 filed on Aug. 2, 2017, the entire contents of which are incorporated herein by reference.

FIELD

The disclosure relates to interference determination methods, interference determination systems, and computer programs, and specifically relates to a method for computing a range in which obstacle interference occurs, in a path generation method and a path generation device for generating a path of a robot arm.

BACKGROUND

It takes a large amount of time and effort to determine, when an industrial robot is made to perform a given operation, a motion path of a robot arm that executes the work, using programming or teaching in which a real machine is actually operated.

In contrast, if an algorithm that, when a motion start point (start point) and a motion end point (end point) are input, automatically generates a path between the start point and the end point can be used, it is expected that the time it takes to teach the industrial robot can be substantially reduced.

JP 2012-223845A discloses a method for checking whether or not a robot arm will interfere with a surrounding object, when the operation of the robot arm of an industrial robot is to be controlled. JP 2012-223845A discloses an interference prediction method in which the positions of a robot on a path connecting a start point and an end point are designated at discrete time instances when the robot follows the path so as to calculate regions occupied by the robot at the respective time instances, a plurality of convex hulls are calculated by combining the occupied regions at adjacent discrete time instances, whether or not these convex hulls have a shared region shared in a convex polyhedron that approximates to a nearby obstacle with a polyhedron is calculated, and the occurrence of interference is determined if a shared region exists.

When the path is generated using such an algorithm, it is preferable that the path can be generated taking the surrounding environment, that is, obstacles such as a belt conveyor, for example, in which the industrial robot is installed, into consideration, which makes it possible to generate a path that is better adjusted to the actual environment.

JP 2012-223845A is an example of background art.

SUMMARY

Path computation processing needs to be sped up when such a path is automatically generated. For example, in the case where a plurality of grip-target objects that flow irregularly on a belt conveyor are to be each gripped by a robot arm, paths need to be computed for the respective grip-target objects, and therefore the speed of the computation processing needs to be increased. This is because the length of computation time directly affects the movable speed of the belt conveyor, and the production efficiency.

In an interference determination method described in JP 2012-223845A, whether or not a shared region exists between each of all of the convex hulls each obtained by combining occupied regions at adjacent discrete time instances and a convex polyhedron that approximates to an obstacle around the robot is determined, and as a result, there is a problem in that the time take to determine whether or not an interference exists is long.

One or more aspects have been made in view of the foregoing problem, and may provide an interference determination method, an interference determination system, and a computer program with which whether or not a robot that moves according to a motion path will interfere with an object around the robot can be computed at high speed.

An interference determination method according to an aspect is a method of determining whether it is possible that a robot including a plurality of movable shafts interferes with a surrounding object that exists around the robot while the robot moves from a first position to a second position, using a computation device including an acquisition unit, a storage unit, and a computation unit. The computation unit stores robot data for approximating a shape of the robot as a polyhedron for each focused part into the storage unit, and stores data of a surrounding object approximated body that approximates to a shape of the surrounding object into the storage unit. Furthermore, the acquisition unit acquires the first position and the second position. Also, the computation unit sets at least one intermediate position on a motion path of movement from the first position to the second position, and generates a plurality of robot approximated bodies that approximate the shape of the robot at the first position, the second position, and the intermediate position as polyhedrons with respect to at least one focused part based on the robot data. Furthermore, the computation unit generates a plurality of first combined approximated bodies each constituted by combining at least two robot approximated bodies of the plurality of robot approximated bodies corresponding to the first position, the second position, and the intermediate position, with respect to the at least one focused part, and generates a second combined approximated body constituted by combining at least two first combined approximated bodies. Then, the computation unit determines whether the second combined approximated body interferes with the surrounding object approximated body.

According to an aspect, a first combined approximated body is generated by combining at least two robot approximated bodies corresponding to postures that a robot can take, and whether interference with a surrounding object is possible can be determined using a second combined approximated body that is constituted by combining a plurality of first combined approximated bodies, and as a result, whether interference is possible can be determined without always performing determination processing with respect to all of the postures that the robot can take, and therefore an interference determination method in which whether a robot will interfere with a surrounding object on a motion path of the robot can be computed at high speed can be provided.

In an aspect, if interference between the second combined approximated body and the surrounding object approximated body has been determined, interference with the surrounding object approximated body using the first combined approximated bodies included in the second combined approximated body may be determined.

According to an aspect, whether interference is possible is determined using a plurality of first combined approximated bodies, and therefore determination accuracy can be improved. That is, comparison needs only be performed with respect to a first combined approximated body included in a second combined approximated body for which interference is possible, and as a result, highly accurate interference determination can be performed with a small amount of computation.

In an aspect, the plurality of first combined approximated bodies may be each constituted by combining two robot approximated bodies that are adjacent on the motion path.

According to an aspect, the interference position can be specified in a region between two adjacent robot approximated bodies, and therefore a region with respect to which processing, for specifying a detailed interference position, whose processing load is relatively large compared with processing for determining whether interference is possible using an approximated body is executed can be limited. Accordingly, processing for specifying a detailed interference position can be executed at high speed.

In an aspect, the configuration may be such that a region between any adjacent robot approximated bodies of the plurality of robot approximated bodies, with respect to the focused part, is included in at least one first combined approximated body.

According to an aspect, since a region of adjacent arbitrarily robot approximated bodies is included in at least one first combined approximated body, the motion path of a focused part is included in first combined approximated bodies without a gap, and determination accuracy can be improved.

In an aspect, the second combined approximated body may be constituted by combining all of the robot approximated bodies that have been generated with respect to a focused part.

According to an aspect, if it was determined that interference is not possible when interference determination was performed using a second combined approximated body, further interference determination processing need not be performed with respect to a region included in the second combined approximated body, and therefore the speed of the determination processing can be increased.

In an aspect, if it has been determined that a first combined approximated body interferes with the surrounding object approximated body in determining whether the plurality of first combined approximated bodies each interfere with the surrounding object approximated body, extracting a point at which the focused part collides with the surrounding object approximated body between two postures of the focused part respectively corresponding to two adjacent robot approximated bodies included in the first combined approximated body, and generating parameters regarding the position and posture of the robot when the collision has occurred may further be included.

According to an aspect, if it has been determined that a first combined approximated body will interfere with the surrounding object approximated body, the collision point is extracted in a region included in the approximated body, and position and posture parameters of the robot at this time are generated, and as a result, the processing of extracting the collision point that requires long processing time can only be performed inside a limited region, and as a result, the determination processing can be optimized, and the speed of computation can be increased.

In an aspect, storing data of a first surrounding object approximated body that is an approximated body that approximates to the shape of a first focused part that constitutes a portion of the surrounding object, and is smaller than the surrounding object approximated body, to the storage unit by the computation unit is further included; and determining, if it has been determined that the first or second combined approximated body interferes with the surrounding object approximated body, whether the first or second combined approximated body interferes with the first surrounding object approximated body may further be included.

According to an aspect, whether a focused part that constitutes a portion of the surrounding object will interfere with a first or second combined approximated body can be determined, and therefore interference determination with respect to a specific part for which interference is possible, and a portion, of the surrounding object, for which interference is possible can be specified more accurately.

In an aspect, the surrounding object approximated body, the first combined approximated body, and the second combined approximated body are each a first cuboid, which is constituted by line segments that are parallel to respective axes of a first coordinate system constituted by three axes that are orthogonal to each other, and if it has been determined that the first or second combined approximated body interferes with the surrounding object approximated body, whether the first or second combined approximated body interferes with a second cuboid approximated body, which is a second cuboid that approximates to the surrounding object, is constituted by line segments that are parallel to respective axes of a second coordinate system that is obtained by rotating the first coordinate system by a given angle according to the shape of the surrounding object, and is smaller than the first cuboid, may be determined.

According to an aspect, interference determination is first performed using a first cuboid that approximates to a surrounding object, if interference is determined, and interference determination is performed using a second cuboid that approximates to the surrounding object, and therefore the determination processing using the second cuboid that takes a relatively long period of time compared with a case where the first cuboid is used can only be performed when needed, and as a result, the efficiency of the determination processing can be improved while the accuracy of narrowing down the region in which interference may occur can be improved.

Also, an interference determination system according to an aspect determines whether it is possible that a robot including a plurality of movable shafts interferes with a surrounding object that exists around the robot while the robot moves from a first position to a second position. The interference determination system includes: a storage unit for storing robot data for approximating a shape of the robot as a polyhedron for each of a plurality of focused parts and data of a surrounding object approximated body that approximates to a shape of the surrounding object; and an acquisition unit for acquiring the first position and the second position. Also, a computation unit configured to: set at least one intermediate position on a motion path of movement from the first position to the second position; generate a plurality of robot approximated bodies that approximate the shape of the robot at the first position, the second position, and the intermediate position as polyhedrons with respect to at least one focused part based on the robot data; generate a plurality of first combined approximated bodies each constituted by combining at least two robot approximated bodies of the plurality of robot approximated bodies corresponding to the first position, the second position, and the intermediate position, with respect to the at least one focused part; generate a second combined approximated body constituted by combining at least two first combined approximated bodies; and determine whether the second combined approximated body interferes with the surrounding object approximated body.

According to an aspect, whether interference with a surrounding object is possible can be determined using a first combined approximated body that is configured by combining at least two robot approximated bodies and a second combined approximated body that is constituted by combining a plurality of first combined approximated bodies, and therefore an interference determination system in which whether a robot will interfere with a surrounding object on a motion path of the robot can be computed at high speed can be provided.

In an aspect, the computation unit may be configured to, if it has been determined that the second combined approximated body interferes with the surrounding object approximated body, determine interference with the surrounding object approximated body using the first combined approximated bodies included in the second combined approximated body.

According to an aspect, interference determination is performed using a plurality of first combined approximated bodies, and therefore the determination accuracy can be improved.

In an aspect, the plurality of first combined approximated bodies may each be constituted by combining two robot approximated bodies that are adjacent on the motion path.

According to an aspect, the interference position can be specified in a region between two adjacent robot approximated bodies, and processing for specifying the interference position can be executed at high speed.

In an aspect, a region between any adjacent robot approximated bodies of the plurality of robot approximated bodies, with respect to the focused part, may be included in at least one first combined approximated body.

According to an aspect, the region of adjacent arbitrarily robot approximated bodies is included in at least one first combined approximated body, and therefore the motion path of a focused part is included in first combined approximated bodies without a gap, and determination accuracy is improved. Specifically, an erroneous determination in which no-interference is determined in spite of the fact that interference may occur can be reliably prevented from occurring. In other words, robot approximated bodies that are generated with respect to a plurality of postures from an initial posture (position) to a target posture (position) with respect to a focused part each has a region that is shared by another robot approximated body. Accordingly, the motion path of a focused part can be included in first combined approximated bodies without a gap, and therefore the determination accuracy can be improved (erroneous determination and the like are prevented from occurring).

In an aspect, the second combined approximated body may be constituted by combining all of the robot approximated bodies that have been generated with respect to the focused part.

According to an aspect, if it has been determined that interference is not possible as a result of performing interference determination using a second combined approximated body, further interference determination processing with respect to a region included inside the second combined approximated body need not be performed, and therefore the speed of the determination processing can be improved.

In an aspect, if it has been determined that a given first combined approximated body interferes with the surrounding object approximated body in determining whether the plurality of first combined approximated bodies each interfere with the surrounding object approximated body, extracting a point at which the focused part collides with the surrounding object approximated body between two postures of the focused part respectively corresponding to two adjacent robot approximated bodies included in the first combined approximated body, and generating parameters regarding the position and posture of the robot when the collision has occurred may further be included.

According to an aspect, if it has been determined that a first combined approximated body will interfere with the surrounding object approximated body, a collision point is extracted in a region included in the approximated body, and the position and posture parameters of the robot at this time are generated, and therefore the processing of extracting the collision point that requires a long processing time can only be performed inside a limited region, and as a result, the determination processing can be optimized, and the speed of computation can be increased.

In an aspect, the computation unit includes storing data of a first surrounding object approximated body that is an approximated body that approximates to the shape of a first focused part that constitutes a portion of the surrounding object, and is smaller than the surrounding object approximated body into the storage unit, and may further include determining, if it has been determined that the first or second combined approximated body interferes with the surrounding object approximated body, whether the first or second combined approximated body interferes with the first surrounding object approximated body.

According to an aspect, interference with a first or second combined approximated body can be determined with respect to a focused part that constitutes a portion of the surrounding object, and therefore interference determination can be performed with respect to a specific part for which interference is possible, and a part of the surrounding object for which interference is possible can be more accurately specified.

In an aspect, the surrounding object approximated body, the first combined approximated body, and the second combined approximated body are each a first cuboid that is constituted by line segments that are parallel to respective three axes that constitute a first coordinate system and are orthogonal to each other, and if it has been determined that the first or second combined approximated body interferes with the surrounding object approximated body, whether the first or second combined approximated body interferes with a second cuboid approximated body, which is a second cuboid that approximates to the surrounding object, is constituted by line segments that are parallel to respective axes of a second coordinate system that is obtained by rotating the first coordinate system by a given angle according to the shape of the surrounding object, and is smaller than the first cuboid, may be determined.

According to an aspect, interference determination is first performed using a first cuboid that approximates to a surrounding object, if interference is determined, interference determination is performed using a second cuboid that approximates to the surrounding object, and therefore the determination processing using the second cuboid that takes a relatively long period of time compared with a case where the first cuboid is used can only be performed when needed, and as a result, the efficiency of the determination processing can be improved while the accuracy of narrowing down of the region in which interference may possibly occur can be improved.

Also, a computer program according to an aspect is a computer program for determining whether it is possible that a robot including a plurality of movable shafts interferes with a surrounding object that exists around the robot while the robot moves from a first position to a second position, the computer program causes a computer to perform: storing robot data for approximating a shape of the robot as a polyhedron for each of a plurality of focused parts; storing data of a surrounding object approximated body that approximates to a shape of the surrounding object; acquiring the first position and the second position; setting at least one intermediate position on a motion path of movement from the first position to the second position; generating a plurality of robot approximated bodies that approximate the shape of the robot at the first position, the second position, and the intermediate position as polyhedrons with respect to at least one focused part based on the robot data; generating a plurality of first combined approximated bodies each constituted by combining at least two robot approximated bodies of the plurality of robot approximated bodies corresponding to the first position, the second position, and the intermediate position, with respect to the at least one focused part, and further generating a second combined approximated body constituted by combining at least two first combined approximated bodies; and determining whether the second combined approximated body interferes with the surrounding object approximated body.

According to an aspect, whether interference with a surrounding object is possible can be determined using a first combined approximated body that is configured by combining at least two robot approximated bodies and a second combined approximated body that is constituted by combining a plurality of first combined approximated bodies, and therefore, whether interference is possible can be determined without always performing the determination processing with respect to all of the postures that the robot can take. Accordingly, a computer program that can compute whether a robot will interfere with a surrounding object on the motion path at high speed can be provided.

Also, an interference determination method according to an aspect is a method of determining whether it is possible that a robot including a plurality of movable shafts interferes with a surrounding object that exists around the robot while the robot moves from a first position to a second position, using a computation device including an acquisition unit, storage unit. Also, the computation unit: stores robot data for approximating a shape of the robot as a polyhedron for each of a plurality of focused parts into the storage unit; stores data of a surrounding object approximated body that approximates to a shape of the surrounding object into the storage unit; acquires the first position and the second position using the acquisition unit; sets at least one intermediate position on a motion path of movement from the first position to the second position; generates a plurality of robot approximated bodies that approximate the shape of the robot at the first position, the second position, and the intermediate position as polyhedrons with respect to each of the plurality of focused parts based on the robot data; generates a total combined approximated body that is constituted by combining all the robot approximated bodies that have been generated; determines whether the total combined approximated body interferes with the surrounding object approximated body; generates, if interference has been determined, a plurality of partial combined approximated bodies that are each constituted by combining at least two of the plurality of robot approximated bodies corresponding to the first position, the second position, and the intermediate position, with respect to each of the plurality of focused parts; and determines whether the plurality of partial combined approximated bodies each interferes with the surrounding object approximated body.

According to an aspect, interference with a surrounding object is determined using a total combined approximated body constituted by a plurality of robot approximated bodies, and if interference has been determined, interference with the surrounding object is determined using a partially combined approximated body, and if no-interference has been determined, interference determination processing with respect to a region inside the total combined approximated body can be omitted, and as a result high speed interference determination processing can be realized.

Also, an interference determination system according to an aspect is an interference determination system for determining whether it is possible that a robot including a plurality of movable shafts interferes with a surrounding object that exists around the robot while the robot moves from a first position to a second position. Also, the interference determination system is configured to include: a storage unit for storing robot data for approximating a shape of the robot as a polyhedron for each of a plurality of focused parts, and data of a surrounding object approximated body that approximates to a shape of the surrounding object; an acquisition unit for acquiring the first position and the second position; and a computation unit configured to: set at least one intermediate position on a motion path of movement from the first position to the second position; generate a plurality of robot approximated bodies that approximate the shape of the robot at the first position, the second position, and the intermediate position as polyhedrons with respect to each of the plurality of focused parts based on the robot data; generate a total combined approximated body that is constituted by combining all of the robot approximated bodies; determine whether the total combined approximated body interferes with the surrounding object approximated body; generate, if interference has been determined, a plurality of partial combined approximated bodies that are each constituted by combining at least two of the plurality of robot approximated bodies corresponding to the first position, the second position, and the intermediate position, with respect to each of the plurality of focused parts; and determine whether the plurality of partial combined approximated bodies each interferes with the surrounding object approximated body.

According to an aspect, interference with a surrounding object is determined using a total combined approximated body constituted by a plurality of robot approximated bodies, and if interference has been determined, interference with the surrounding object is determined using a partially combined approximated body, and if no-interference has been determined, interference determination processing with respect to a region inside the total combined approximated body can be omitted, and as a result high speed interference determination processing can be realized.

Also, a computer program according to an aspect is a computer program for determining whether it is possible that a robot including a plurality of movable shafts interferes with a surrounding object that exists around the robot while the robot moves from a first position to a second position, the computer program causes a computer to perform: storing robot data for approximating a shape of the robot as a polyhedron for each of a plurality of focused parts; storing data of a surrounding object approximated body that approximates to a shape of the surrounding object; acquiring the first position and the second position; setting at least one intermediate position on a motion path of movement from the first position to the second position; generating a plurality of robot approximated bodies that approximate the shape of the robot at the first position, the second position, and the intermediate position as polyhedrons with respect to each of the plurality of focused parts based on the robot data; generating a total combined approximated body that is constituted by combining all of the robot approximated bodies that have been generated; determining whether the total combined approximated body interferes with the surrounding object approximated body; generating, if interference has been determined, a plurality of partial combined approximated bodies that are each constituted by combining at least two of the plurality of robot approximated bodies corresponding to the first position, the second position, and the intermediate position, with respect to each of the plurality of focused parts; and determining whether the plurality of partial combined approximated bodies each interferes with the surrounding object approximated body.

According to an aspect, interference with a surrounding object is determined using a total combined approximated body constituted by a plurality of robot approximated bodies, and if interference has been determined, interference with the surrounding object is determined using a partially combined approximated body, and if no-interference has been determined, interference determination processing with respect to a region inside the total combined approximated body can be omitted, and as a result high speed interference determination processing can be realized.

According to one or more aspects, a method with which whether or not a robot interferes with a surrounding object on a motion path can be computed at high speed can be provided.

BRIEF DESCRIPTION OF THE DRAWINGS

FIG. 2 is a flowchart illustrating pre-processing of an interference determination method according to a first embodiment.

FIGS. 7A and 7B are diagrams illustrating a first cuboid (object level and space level) of an obstacle.

FIGS. 19A to 19F are diagrams illustrating a method of generating a convex hull.

FIGS. 20A and 20B are diagrams illustrating a determination error based on a convex hull.

FIG. 23 is a diagram illustrating a tree structure of a robot used for interference determination according to a second embodiment.

DETAILED DESCRIPTION

Figure 1:
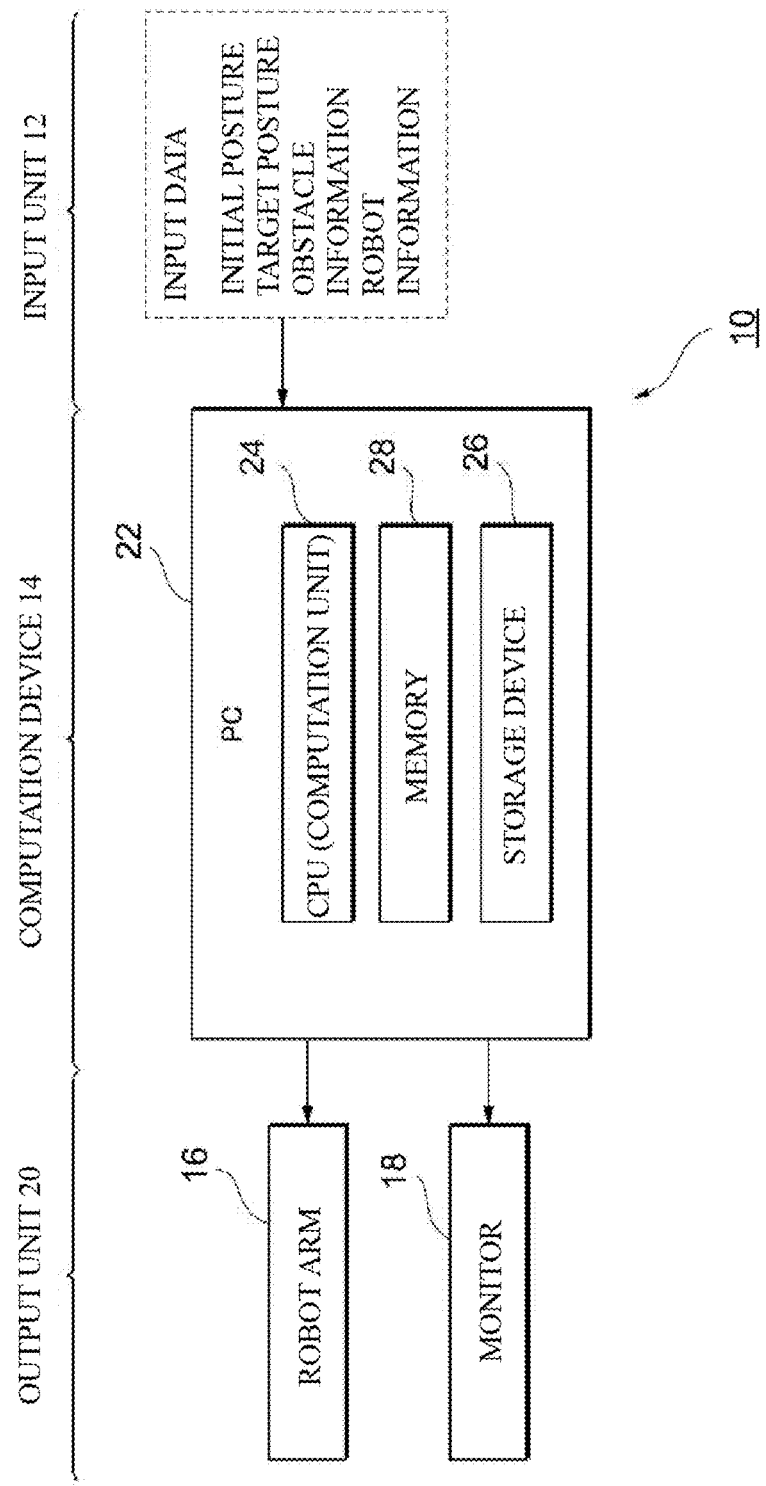
FIG. 1 is a hardware block diagram illustrating an interference determination system according to a first embodiment.

Embodiments will be described with reference to the accompanying drawings. Note that in the drawings, constituent elements denoted by the same reference numerals have the same or similar configurations.

First Embodiment

FIG. 1 is a hardware block diagram of an interference determination system 10 according to a first embodiment. As shown in the diagram, the interference determination system 10 includes an input unit 12 for inputting information, a computation device 14 for processing information, and an output unit 20 including a robot arm 16 that is controlled based on a computation result and a monitor 18 for displaying a result. Note that the interference determination system 10 needs only be configured so as to determine whether interference between the robot arm 16, which is a control target, and an obstacle will occur based on a result of computation executed in the computation device 14. Therefore, an output unit 20 that uses a computation result with respect to interference determination need not be provided.

The input unit 12 functions as an interface for inputting information to the computation device 14, and includes an unshown keyboard and the like for inputting an initial posture and a target posture of the robot arm, which is input data, information regarding a robot, information regarding an obstacle, and the like. But, there is no limitation thereto, and any configuration for inputting information to be a target of computation processing may be adopted. For example, information to be a target of computation processing is stored in a storage medium such as a DVD or CD, and a drive for reading out this information may be provided as the input unit 12. Also, a configuration in which information is input to the computation device 14 via a network or the like can be adopted. Here, the information regarding a robot preferably includes a robot model for expressing a three-dimensional shape of the robot in a virtual space, and the information regarding an obstacle preferably includes an obstacle model for expressing a three-dimensional shape of the obstacle (surrounding object) in a virtual space. In an embodiment, an example in which the robot model and the obstacle model that are input via the input unit 12 are mesh models that are expressed as meshes is illustrated, but the expression form of the model is not specifically limited to a mesh model. Note that the robot model may include a model for expressing a three-dimensional shape of a robot arm, which will be described later, in a virtual space, and a model for expressing a three-dimensional shape of an end effector provided in a leading end of the robot arm in a virtual space.

Here, the posture of the robot arm 16 indicates a posture of the robot arm 16 when a plurality of drive shafts included in the robot arm 16 are at respective given angles. The posture of the robot arm 16 is uniquely determined by determining angles of the plurality of drive shafts included in the robot arm 16. Also, as a result of determining the angles of the plurality of drive shafts included in the robot arm 16, the position of the leading end of the robot arm 16 can be calculated using a forward kinematics calculation. Also, a given position of the end effector can be calculated based on the position of the leading end of the robot arm 16 and shape data of the end effector to be attached to the leading end of the robot arm. On the other hand, when the position of the leading end of the robot arm 16 is given, the angles of the respective plurality of drive shafts needed to locate the leading end of the robot arm 16 at the position, that is, the posture of the robot arm 16 can be calculated using an inverse kinematics calculation. In this way, the position of the leading end and the posture of the robot arm 16 are related to each other, and when information regarding at least one of the position and posture is given, the information regarding the other can be calculated based on a kinematics calculation.

Therefore, the information regarding the initial posture of the robot arm may be information regarding an initial position when the robot arm is to be moved from the initial posture to a target posture, as well, and may include information regarding the initial position. Here, the initial position can be used as a first position, which is a start point when a motion path of the robot arm is computed. The initial position (first position) can be expressed using coordinates indicating the leading end of the robot arm or a given position of an end effector to be attached to the leading end of the robot arm. Also, the information regarding the target posture of the robot arm may be information regarding a target position when the robot arm is to be moved from the initial posture to the target posture, and may include information regarding the target position as well. Here, the target position can be used as a second position, which is an end point when a motion path of a robot arm is computed. The target position (second position) is preferably expressed by coordinates indicating the leading end of the robot arm or a given position of an end effector to be attached to the leading end of the robot arm. The computation device 14 can calculate the initial posture based on the initial position, and calculate the target posture based on the target position using an inverse kinematics computation program stored in a later-descried storage device 26, for example.

Note that the computation device 14 may calculate at least one of information regarding the initial position (initial posture) of the robot arm and information regarding the target position (target posture) based on information regarding the surrounding environment of the robot arm. For example, the computation device 14 may acquire image information obtained through measurement by an image sensor that captures images of the surrounding environment of the robot arm using the input unit 12, and may calculate information regarding the initial position (initial posture) and information regarding the target position (target posture) through computation based on the acquired sensor information (image information). Also, the computation device 14 may acquire at least one of information regarding the initial position (initial posture) that is calculated based on the information regarding the surrounding environment of the robot arm and information regarding the target position (target posture) via the input unit 12.

The computation device 14 can typically be realized by a personal computer (PC) 22, and includes a hardware processor (CPU 24, for example) that functions as a computation unit that executes various types of computation processing shown in an embodiment, a storage device 26 such as an HDD, an SSD, and a flash memory for storing, in a nonvolatile manner, a computer program for path computation and a computer program for executing each part of processing in collision (interference) determination disclosed in an embodiment, and a memory 28 constituted by an SRAM, a DRAM, and the like for temporal storage. The memory 28 and storage device 26 function as a storage unit in which various types of information to be a target of processing are stored. Also, the function of the computation unit is realized by the hardware processor executing a program for given computation processing. Also, a graphic GPU (Graphic Processing Unit), an FPGA (Field Programmable Gate Array), a DSP (Digital Signal Processor), and an ASIC (Application Specific Integrated Circuit) for executing specific processing may be used along with the CPU 24 or separately as the computation unit. Also, the computation unit and the storage unit may not be integrated.

The output unit 20 includes the robot arm 16, which is a control target, and a monitor 18 (display device) for displaying a determination result. The robot arm 16 is connected to the computation device 14 by an unshown external interface, and is configured to be able to be controlled based on control information output from the computation device 14. The control target needs only be a robot for which there is a need to determine whether or not the robot will interfere with a nearby obstacle when the robot operates along an arbitrary path, and is not limited to the robot arm 16.

FIG. 2 is a flowchart illustrating pre-processing for generating data necessary for determination processing. The pre-processing includes processing for generating an approximated model for expressing an obstacle in a virtual space, that is, processing for generating an approximated body, and processing for generating an approximated model for expressing a robot in the virtual space and for performing interference determination, that is, processing for generating robot data. This pre-processing is processing to be executed every time an obstacle or a robot to be a control target is changed. Note that these types of processing and types of processing to be executed in an embodiment are executed by the CPU 24 according to computer programs stored in the storage device 26. Note that, in an embodiment, the computation device 14 generates an approximated obstacle model (surrounding object approximated body), which is an obstacle model expressed as a mesh, using a later-described given method utilizing a bounding sphere, a cuboid, a convex hull, and the like, or another known method, in step S11. Also, the computation device 14 generates an approximated robot model (robot data), which is a robot model expressed as a mesh, using a later-described given method utilizing a bounding sphere, a cuboid, a convex hull, and the like, or another known method, in step S12. The robot model and the obstacle model, which are expressed as meshes or the like, are generated so as to approximate each focused part that is respectively set to the robot and the obstacle. A focused part is a part that includes the entirety or a portion of the obstacle or the robot, and is appropriately set, as will be described later, based on the shape of the obstacle and the structure of the robot.

First, as shown in step S11, an approximated obstacle model is generated using a later-described given method utilizing a bounding sphere, a cuboid, a convex hull, or the like, or another known method, based on an obstacle model expressed as a mesh that is input from the input unit 12. In an embodiment, an obstacle model that constitutes a BVH (Bounding Volume Hierarchy) is generated based on an obstacle model expressed as a mesh. Here, the obstacle is not limited to one obstacle, and may be a plurality of obstacles. Also, the obstacle is not limited to a stationary object, and may be a moving object. In the case where the obstacle is a moving object, in computation processing of later-described interference determination, the moving path of the moving object is considered, and interference determination is performed such that pieces of time series data with respect to the motion path of the robot and the moving path of the moving object are taken into consideration. Here, the BV (Bounding Volume) refers to a simple shape that approximates to an object, which is an approximation target, so as to include the object, and the BVH refers to a hierarchical structure in which the BV is a constituent element. Methods of generating the BV and the BVH will be described using the drawings. Note that, in an embodiment, an example will be described in which an object is approximated by dividing the object into a plurality of constituent elements (portions), and the BVH is used to hierarchically structure the constituent elements (portions), but the method to hierarchically structure the constituent elements is not limited to the BVH. That is, a tree-structured (hierarchically structured) obstacle model needs only be generated by separating, based on an obstacle model that is input from the input unit 12, the obstacle model for each focused part, and hierarchically organizing the obstacle models that are separated for the respective focused parts. A method in which an obstacle model is divided along a plurality of planes that are perpendicular to one of given coordinate axes, and the divided obstacle models are hierarchically structured is used as the method of separating the obstacle model for each focused part, and hierarchically organizing the separated obstacle models, for example.

Figure 3A:
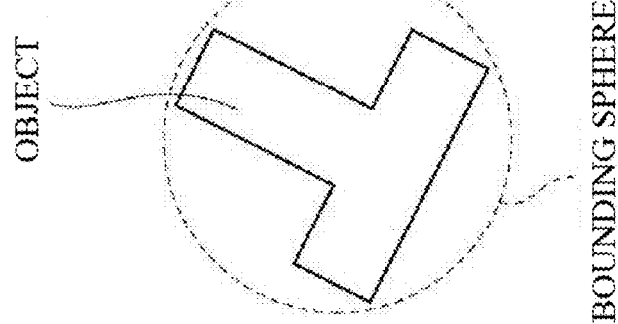
FIGS. 3A to 3D are diagrams illustrating an example of a bounding volume that approximates to an object.

FIGS. 3A to 3D show one example of the BV. For example, FIG. 3A shows a sphere (Bounding Sphere) BV that includes an object having an inclined protruding shape. The bounding sphere can be specified by the position and radius of the sphere. For example, in the present example, interference between bounding spheres can be determined in a short period of time, which is in the order of one nanosecond. Note that the BV is not limited to a BV that is in contact with an object to be included, and the BV can be generated so as to be larger than the object so as to include the object with a predetermined margin.

Figure 3B:
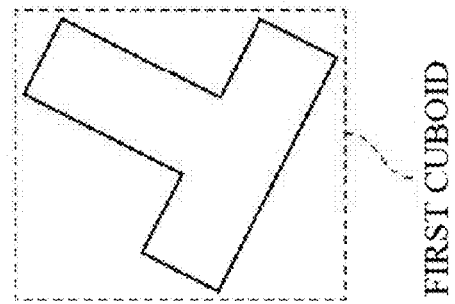

FIG. 3B is a conceptual diagram for describing an example in which the same object is approximated by a BV that is different from the bounding sphere. The BV shown in FIG. 3B is constituted by line segments that are parallel to the axes of a given reference coordinate system (absolute coordinate system including X, Y, and X axes that are orthogonal to each other in which horizontal directions are represented by an X axis and a Y axis, and a vertical direction is represented by a Z axis, for example), and the BV is a first cuboid BV that includes an approximation target object. In other words, the first cuboid refers to a cuboid BV that is constituted by line segments that are parallel to basic coordinate axes (axes of first coordinate system), and in the case of a three-dimensional rectangular coordinate system, the first cuboid is a cuboid that is parallel to an X axis, which is a coordinate axis, a Y axis that is orthogonal to the X axis, and a Z axis that is orthogonal to the X axis and the Y axis, and includes the object. The first cuboid can be specified by the positions of the axes and the lengths of sides. Also, the first cuboid can be specified by minimum and maximum coordinates in each of the axes in the reference coordinate system, and, in the present example, the time it takes to determine interference between first cuboids is in the order of one nanosecond, for example.

Figure 3C:
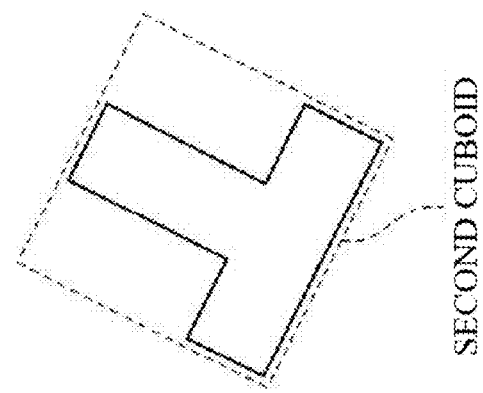

FIG. 3C is a conceptual diagram illustrating a BV, which is different from the bounding sphere and the first cuboid, that approximates to the same object. The BV shown in FIG. 3C is constituted by line segments that are parallel to axes of a rotated coordinate system (second coordinate system) obtained by rotating the given reference coordinate system by a given angle according to the shape or the like of the object, and is a second cuboid BV that includes the approximation target object. In other words, the second cuboid is a cuboid BV that is inclined relative to the coordinate axes of the reference coordinate system (first coordinate system), and in the case where the reference coordinate system is the three-dimensional rectangular coordinate system, the second cuboid is constituted by a cuboid that is inclined relative to the X axis, which is a coordinate axis, the Y axis that is orthogonal to the X axis, and the Z axis that is orthogonal to the X axis and the Y axis, and includes the object. The second cuboid can be specified by inclinations relative to the axes, in addition to the positions of the axes and the lengths of sides. For example, in the present example, the time it takes to determine interference is in the order of 100 nanoseconds, which is longer than that in the case of the first cuboid. Note that, in the second cuboid, the area or the volume of a region that is not occupied by an object in the BV is small relative to the first cuboid, and therefore there are cases where the determination accuracy will improve. This is because the second cuboid is constituted by line segments that are parallel to the axes of a coordinate system that is inclined according to the shape or the like of an approximation target object, and in many cases, has a shape closer to the shape of the object than in the case of the first cuboid.

Figure 3D:
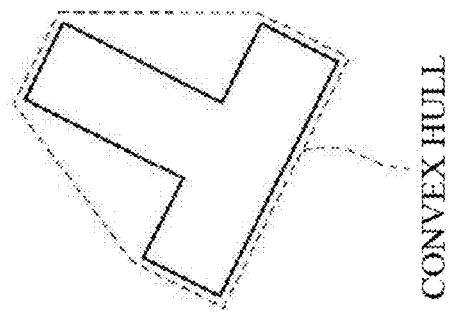

FIG. 3D shows an example in which the same object is approximated by a convex hull. The convex hull refers to a minimum convex polygon that includes a plurality of points that exist in the coordinate system. Substantially many parameters are required to specify a given convex hull relative to the first cuboid and the second cuboid, and therefore the time it takes to determine interference exponentially increases according to the number of points. The convex hull will be described later in detail. In an embodiment, an object is approximated by not only the first cuboid, but also by the above-described bounding sphere, second cuboid, and convex hull. Also, another known method can be used to approximate an object. The coordinate system used when an object is approximated and interference determination is performed is not limited to a two-dimensional or three-dimensional rectangular coordinate system, and a polar coordinate system and an oblique coordinate system can also be used.

Figure 4:
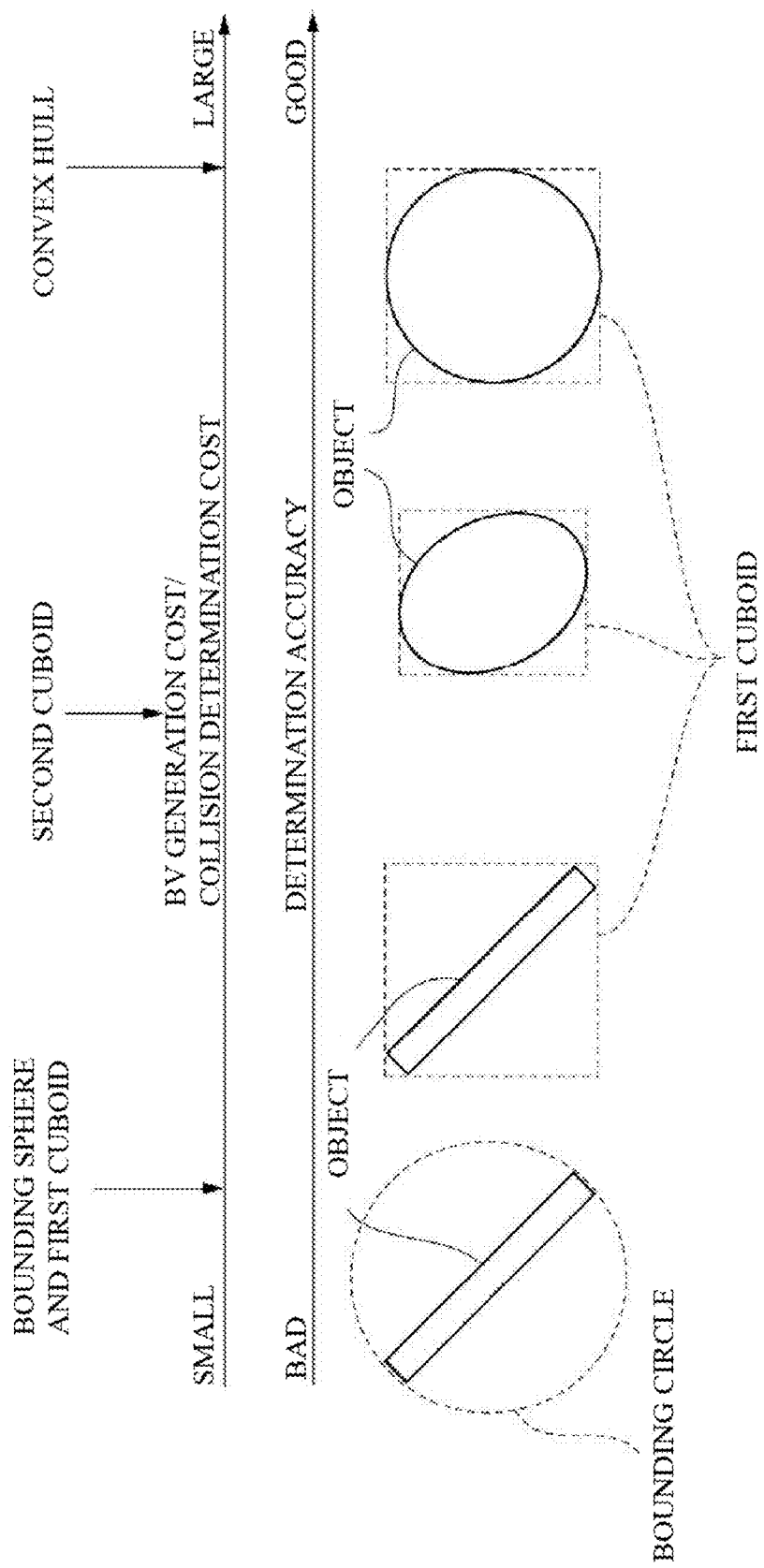
FIG. 4 is a diagram illustrating a comparison of determination accuracy and a generation cost and the like of an object approximated body.

FIG. 4 is a diagram in which these approximated bodies of an object are compared from viewpoints of generation cost (time required for generation) of the approximated bodies, collision (interference) determination cost (time required for determination), and determination accuracy. As shown in the diagram, the generation cost and the determination cost of the bounding sphere and the first cuboid that can be specified by a small number of parameters are small. Note that because the region that is the difference between the approximated body and the object is large, the determination accuracy is not good, and there are cases where the probability that, although the object will not actually collide with the robot arm, collision is erroneously determined increases. On the other hand, because the convex hull can be approximate to an object with high accuracy using a plurality of points that are extracted from boundaries of the object, while there are cases where the determination accuracy will improve relative to the first cuboid and the like, there is a demerit in that the cost of generating approximation data and a collision determination cost substantially increase relative to the first cuboid and the like. The second cuboid is positioned between the first cuboid and the like and the convex hull, and the cost of generating the approximated body and the collision determination cost are large relative to the cases of the first cuboid and the bounding sphere, but are smaller than the convex hull. Meanwhile, the determination accuracy is superior to the first cuboid and the like, but is less than that of the convex hull.

Furthermore, the determination accuracy with respect to an object is not specified by only a method of approximating the object, and is influenced by the shape of the object to be approximated. That is, as shown in FIG. 4, in the case of an object being an obliquely inclined rectangle, the determination accuracy improves in the case of the first cuboid relative to the bounding sphere (or bounding circle) that approximates to an object so as to include the object. This is because the area of a region in which the object does not exist is small in the first cuboid, and the approximation can be performed with high accuracy. Also, there are cases where the determination accuracy will improve when a circle is adopted as the first cuboid relative to an ellipse, because the area or the volume of a region in which the object does not exist in the BV is small.

Figure 5:
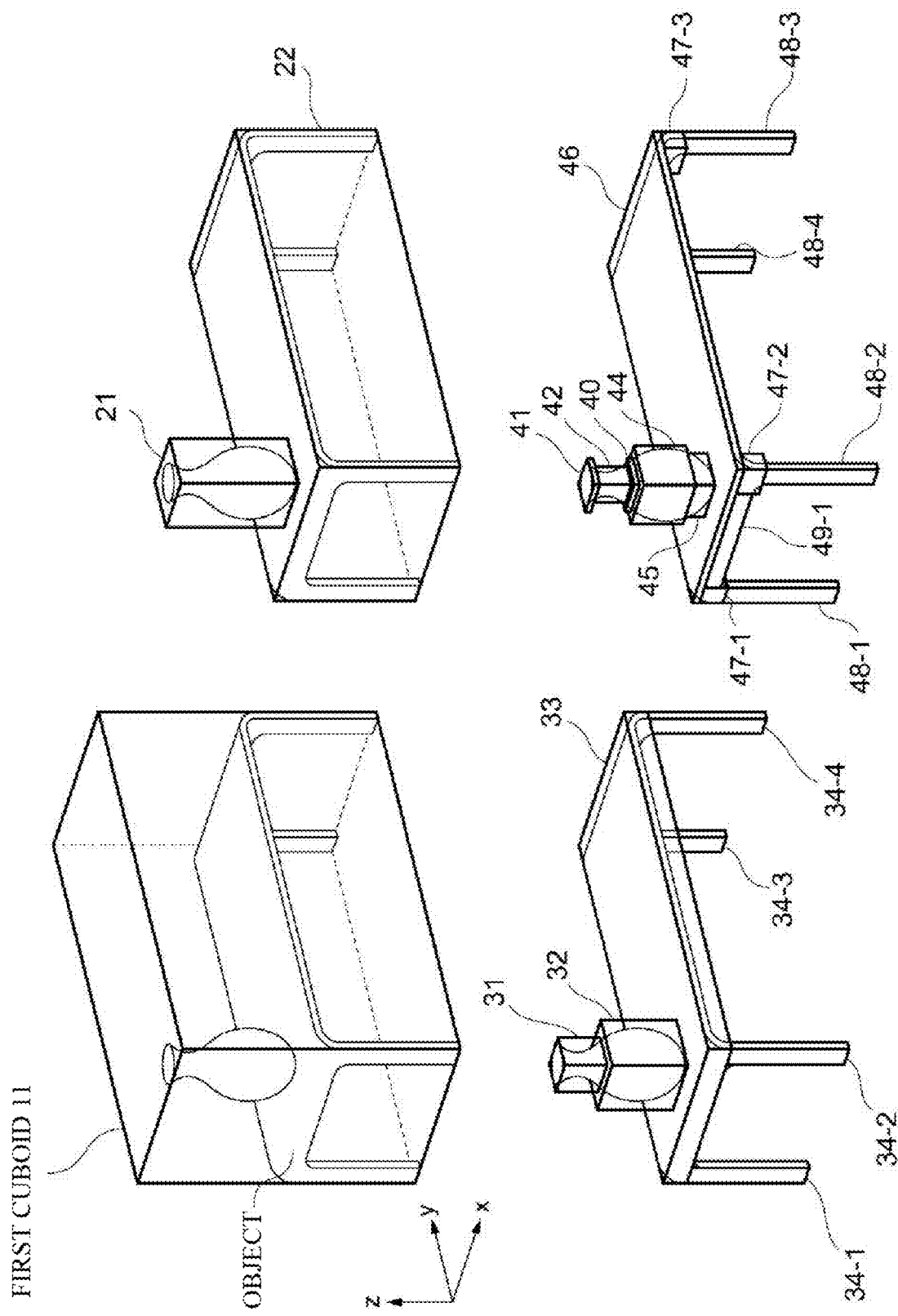
FIG. 5 is a diagram illustrating a hierarchical structure of an approximated body generated based on a mesh model of an object.

FIG. 5 is a diagram illustrating how approximated bodies are hierarchically structured. In the present example, an approximated body in a relatively upper layer is generated so as to include an approximated body in a relatively lower layer, and as a result, the approximated bodies are hierarchically structured. Specifically, FIG. 5 shows an example in which BVH (Bounding Volume Hierarchy) is adopted as the method of generating a tree structure as a hierarchical structure. A case where a mesh model of an object constituted by a table and a vase on the table is approximated by the first cuboid will be described, as an example. FIG. 5(*a*) shows a first cuboid 11 that approximates to the entirety of the object. FIG. 5(*b*) shows a case where the object is divided into an upper half focused part and a lower half focused part, and shows an approximated body including an approximated body constituted by a first cuboid 21 that includes the upper half focused part and an approximated body constituted by a first cuboid 22 that includes the lower half focused part. FIG. 5(*c*) shows a case where the first cuboid 21 is approximated by a first cuboid 31 that includes an upper half focused part of the first cuboid 21 and a first cuboid 32 that includes a lower half focused part, the first cuboid 22 is divided into upper and lower focused parts, and the upper and lower focused parts are respectively approximated by a first cuboid 33 and four first cuboids 34-1 to 34-4. FIG. 5(*d*) shows an example in which the focused parts in FIG. 5(*c*) are further subdivided, and are approximated by 16 first cuboid approximated bodies (first cuboids 41 to 46, 47-1 to 47-4, 48-1 to 48-4, and 49-1 to 49-2). Note that the focused parts can be arbitrarily set. For example, each of the parts obtained by a surrounding object (obstacle) being divided along a plurality of planes that are perpendicular to one predetermined coordinate axis is the focused part. Also, the focused part of a surrounding object (obstacle) can be set according to the volume occupied by the surrounding object. Also, the focused part can be set according to the shape of the surrounding object. For example, in the case where the surrounding object includes a body and a protruding shape that protrudes from the body, the body and the protruding shape are each a focused part. Note that in the case where a focused part is applied to a robot arm that includes a plurality of movable shafts, it is preferable that a link shape provided corresponding to each of the movable shafts is set as the focused part.

In this way, a hierarchical structure is formed in which the first cuboid 11 is the top of the hierarchical structure, the layer that is one layer below includes the first cuboid 21 and the first cuboid 22, the layer below that of the first cuboid 21 includes the first cuboid 31 and the first cuboid 32, the layer below that of the first cuboid 22 includes the first cuboid 33 and the four first cuboids 34-1 to 34-4, and the lowermost layer is constituted by the 16 first cuboids 41 to 49-2, and as a result, a tree structure (BVH) constituted by four layers of first cuboids is formed.

Figure 6A:
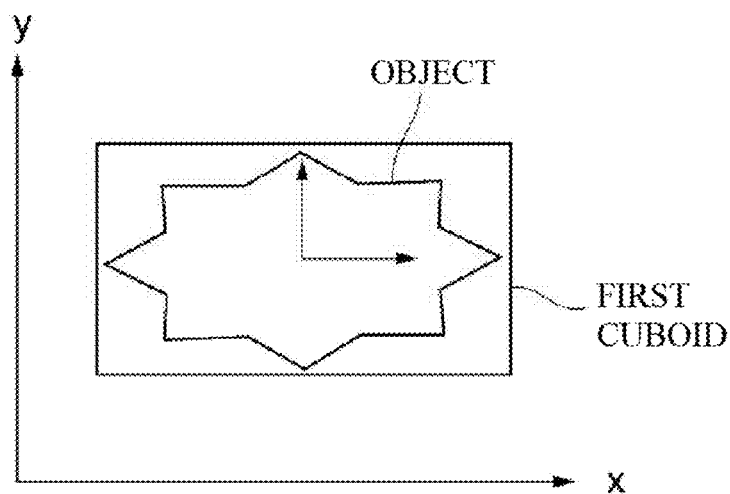
FIGS. 6A and 6B are diagrams illustrating a method of generating a first cuboid.
Figure 6B:
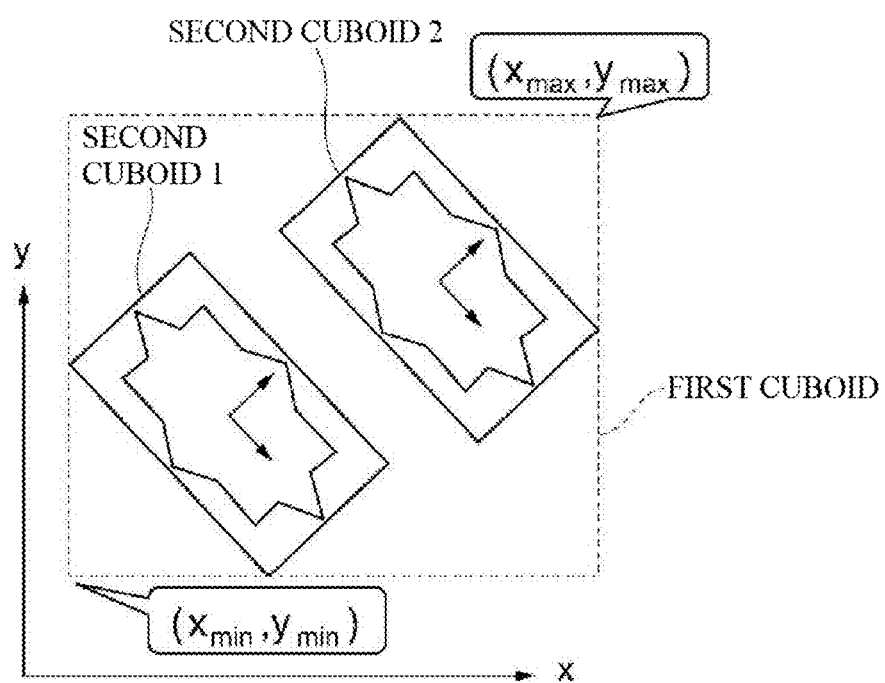

FIGS. 6A and 6B show a method of generating the first cuboid using a two-dimensional coordinate system. FIG. 6A illustrates a first cuboid including a single object, and FIG. 6B shows a case where a first cuboid that includes a second cuboid 1 and a second cuboid 2, which are both a second cuboid, in a combined manner is generated. As shown in FIG. 6A, the first cuboid that includes the object can be generated by extracting maximum values and minimum values of the coordinates of the vertices, in the respective coordinate axes, that constitute the object. Also, in the case of generating a large first cuboid that includes a plurality of first cuboids, maximum values and minimum values of the coordinates of the vertices, in the respective coordinate axes, of the plurality of first cuboids are extracted, and a large first cuboid that includes the extracted maximum values and minimum values is generated. With this, a large first cuboid that includes the plurality of first cuboids can be generated. In a three-dimensional coordinate system as well, as a result of extracting maximum values and minimum values in the X, Y, and Z axes, a first cuboid that includes these values can be similarly generated.

As shown in FIG. 6B, the first cuboid that includes a plurality of second cuboids can be generated by extracting maximum values (xmax, ymax) and minimum values (xmin, ymin) of the coordinates of vertices of the second cuboids in the respective coordinate axes and generating a first cuboid so as to include the extracted maximum values and minimum values. In the three-dimensional coordinate system as well, as a result of extracting maximum values and minimum values in the X, Y, and Z axes with respect to the plurality of second cuboids, a first cuboid that includes these values can be similarly generated. That is, a plurality of approximated bodies that each approximates to an object are generated using a first cuboid, a second cuboid, a convex hull, or another method, processing in which at least two generated approximated bodies are combined or an approximated body is generated so as to include them is repeated, and as a result, a hierarchical structure (tree structure) of the approximated bodies can be generated.

As a result of repeating generation of a first cuboid that further includes the plurality of first cuboids that were generated in this way, a BVH having a tree structure that is constituted by first cuboids can be generated. Accordingly, FIG. 5 can be considered as an outline of a method of generating a BVH having a tree structure in which processing for generating a large first cuboid that includes a plurality of first cuboids is repeated and that is constituted by first cuboids. That is, the method of generating the BVH shown in FIG. 5 includes processing for generating an upper layer (third layer) including seven first cuboids (from first cuboid 31 to first cuboid 34-4) that include an adjacent plurality of first cuboids of the first cuboids in the lowermost layer, 16 first cuboids (from first cuboid 41 to first cuboid 49-2) being the starting point (lowermost layer). Furthermore, the method of generating the BVH shown in FIG. 5 includes processing for generating a second layer including two first cuboids (from first cuboid 21 to first cuboid 22) and an uppermost layer including one first cuboid (first cuboid 11) by repeating similar processing, and constituting these layers from the lowermost layer to the uppermost layer as the BVH.

Note that the number of layers of a hierarchical structure (tree structure) generated by the BVH or another method needs only be at least two, and a two-layer structure may be configured in which 16 first cuboids that are those from first cuboid 41 to first cuboid 49-2 shown in FIG. 5(d) constitute a second layer, and a single first cuboid 11 that is constituted by combining the 16 first cuboids constitutes a first layer, for example. Also, an upper layer first cuboid is not necessarily generated by combining two or three or more adjacent first cuboids, and one first cuboid that includes two or three or more separated first cuboids as a result of combining the first cuboids may be generated, for example. Also, the number of layers may be different for each branch of the tree structure.

Also, the approximated body can be generated using a second cuboid, a bounding sphere, a convex hull, or another shape. First cuboids that are adjacent in the same layer may be configured to overlap at their end portions or the like. Also, the approximated body that is generated through combination need not include an approximated body that is a combination target. For example, the approximated body is assumed to be a convex hull, and an approximated body that is constituted by combining convex hulls so as to include at least a portion of the convex hulls may be generated. Note that the approximated body that is generated through combination needs to be larger than each of the approximated bodies to be combined. Here the approximated body being large (small) refers to the fact that the region occupied by the approximated body in its coordinate system (volume of the approximated body in the case of a three-dimensional rectangular coordinate system) is large (small) relative to the region occupied by another approximated body.

In an embodiment, first, a hierarchical structure (tree structure) constituted by first cuboids is generated for each obstacle using the above-described method (step S11). Specifically, a BVH constituted by a first cuboid that approximates to the obstacle (hereinafter referred to as "first cuboid of an obstacle" or "obstacle first cuboid") is generated based on obstacle information input from the input unit 12.

FIG. 7A is a diagram illustrating an example of the hierarchical structure (tree structure) that is constituted by first cuboids that are generated for respective focused parts with respect to the above-described object (table and vase on the table). FIG. 7B shows a hierarchical structure constituted by first cuboids, in a space level (tree structure). The hierarchical structure is formed by combining hierarchical structures (tree structures) constituted by first cuboids of a plurality of obstacles (obstacles 1 to 5), and in which pieces of position information regarding the respective obstacles included in obstacle information are considered. Note that the hierarchical structure (tree structure) may not be generated for each obstacle, each obstacle may be approximated by a single first cuboid, and a hierarchical structure (tree structure) of the obstacles constituted by first cuboids may be formed by generating a first cuboid that combines a plurality of first cuboids corresponding to the respective obstacles. The obstacle information generated by the computation unit 24 in this way is stored in the storage unit 26, and the processing in step S11 (FIG. 2) is ended.

Next, in step S12, a robot model (robot data) that is expressed using second cuboids is created based on a robot model expressed as a mesh or the like that has been input from the input unit 12.

Figure 8A:
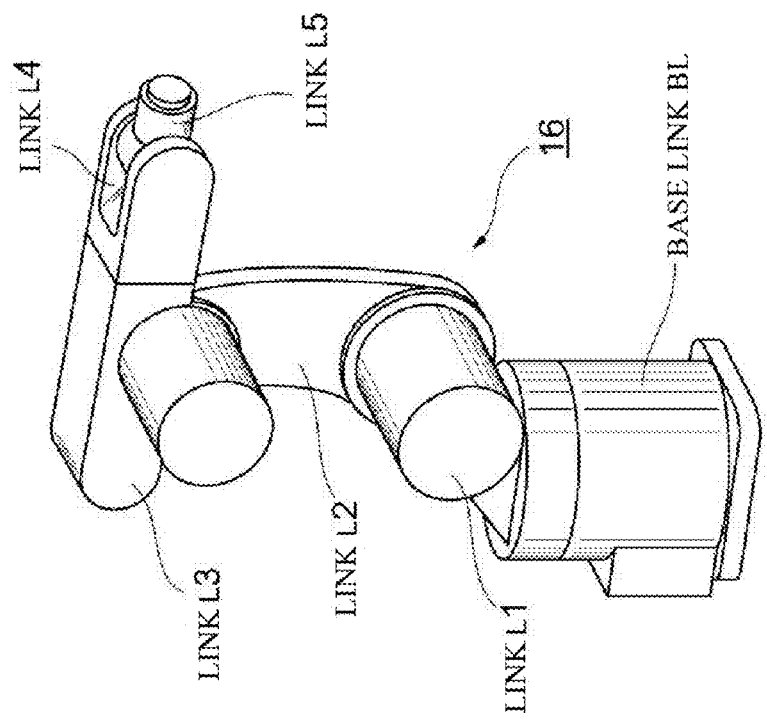
FIGS. 8A and 8B are diagrams illustrating a robot arm according to a first embodiment.
Figure 8B:
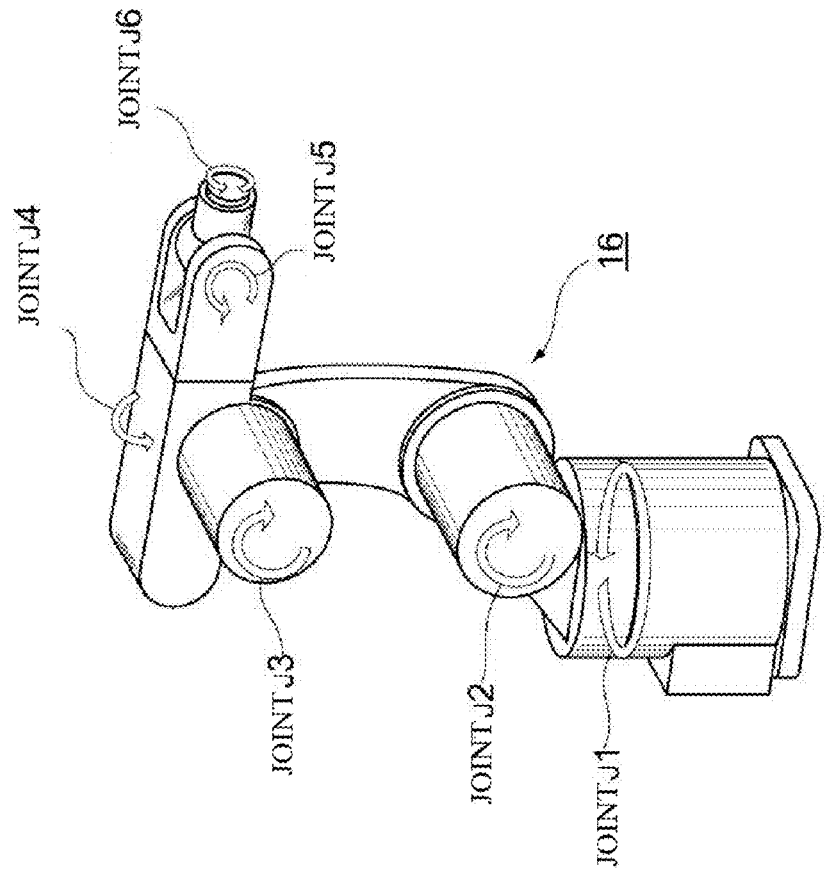

The robot arm 16 in an embodiment is shown in FIGS. 8A and 8B. As shown in FIGS. 8A and 8B, the robot arm 16 includes joints (J1 to J5) that each functions as a movable shaft, and links (BL to L5) that are fixed to a respective given position or rotate according to driving of shafts, and is configured such that the links are movably connected via the joints. Specifically, the robot arm 16 includes the base link BL to be fixed to a given position, the link L1 that is connected to the base link BL by the joint J1, and (relatively) rotates about an axis extending in a direction substantially vertical to the base link BL as shown in the diagram, the link L2 that is connected to the link L1 by the joint J2, and rotates about a rotation axis extending in a substantially horizontal direction relative to the link L1, the link L3 that is connected to the link L2 by the joint J3, and rotates about a rotation axis extending in a substantially horizontal direction relative to the link L2, the link L4 that is connected to the link L3 by the joint J4, and rotates about a rotation axis extending in a direction that is orthogonal to the rotation axis of the joint J3 relative to the link L3, and the link L5 that is connected to the joint J5 by the link L4, and rotates about a rotation axis extending in a direction that is orthogonal to the rotation axis of the joint J4 relative to the link L4, and furthermore, the leading end portion of the link L5 is configured to be able to rotate relative to the link L5 by the joint J6.

Figure 9:
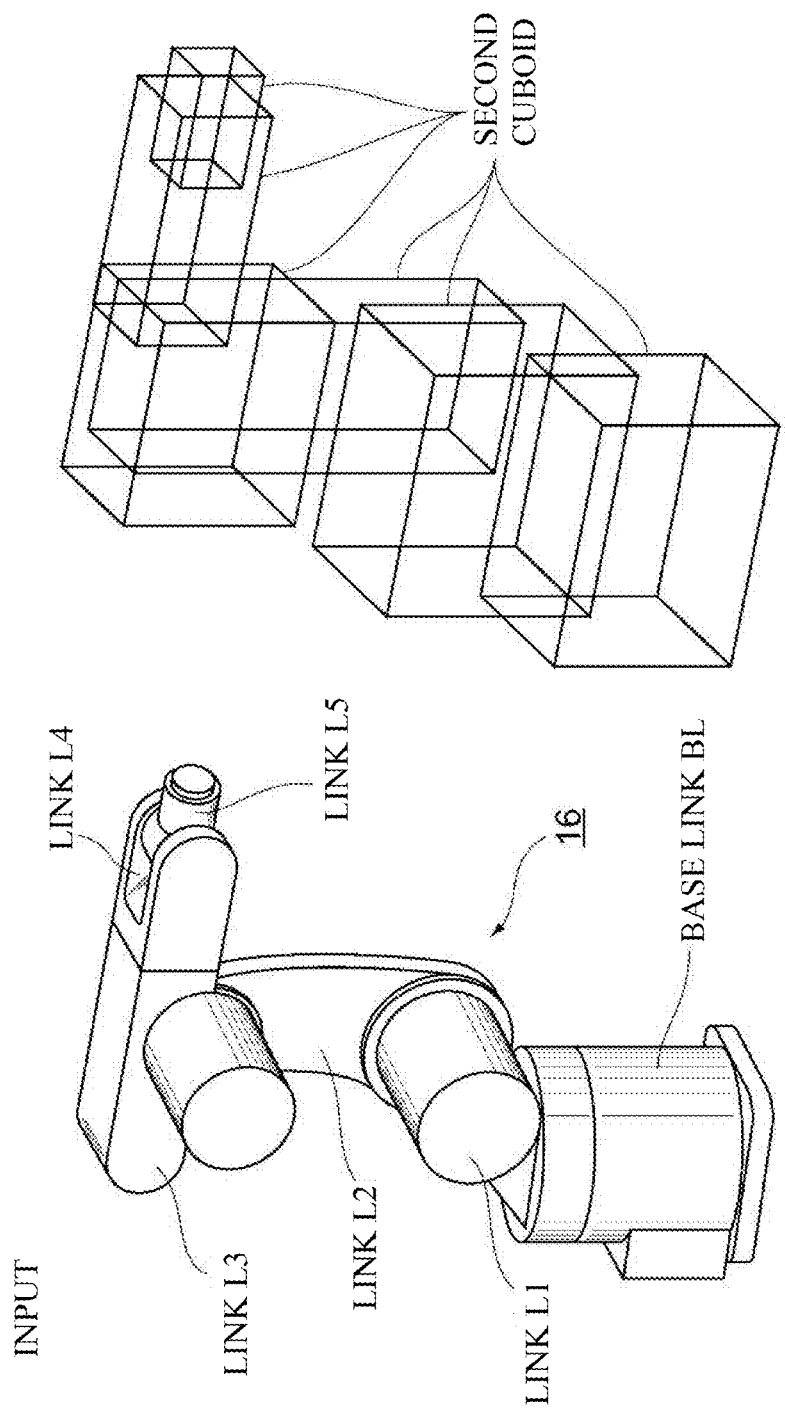
FIG. 9 is a diagram illustrating how a robot arm according to a first embodiment is approximated by a plurality of second cuboids.

FIG. 9 shows an example in which second cuboid robot approximated bodies are generated with respect to six focused parts including parts from the base link BL to the link L5 of the robot arm 16. Note that, in an embodiment, the robot arm 16, which is the object, is divided by the links L that integrally move, and second cuboid approximated bodies are generated for the respective focused parts. Note that the focused parts can be flexibly set according to a purpose or the like of the interference determination. For example, a portion that does not move such as the base link BL may be ignored, and second cuboids may be generated for movable parts as the focused parts, alternatively, second cuboids may be generated for the links L4 and L5 that are leading ends of movable portions as the focused parts, and the interference determination may be executed. Also, all of the focused parts need not be approximated by the same type of BV. The interference determination method according to an embodiment can be applied if at least one focused part is approximated by a polyhedron.

Note that the second cuboid is a BV that is constituted by a cuboid that is inclined to a reference coordinate system by a given angle, and computation with respect to the given angle is needed, and therefore the generation cost is large compared with the first cuboid. This is because, while processing for searching for maximum values and minimum values in the respective axes in a coordinate system, from all the vertices that constitute a mesh model, needs only be performed in order to generate the first cuboid, searching with respect to coordinate axes that are inclined by given angles is further required to generate the second cuboid. On the other hand, as shown in FIG. 4, the determination accuracy when the second cuboid is used is better than the first cuboid.

In an embodiment, in the pre-processing shown in FIG. 2, the focused parts (links) of the robot arm 16 are approximated by second cuboids. This is because there are cases where the cost of generating a second cuboid based on a mesh model of the robot arm 16 is lower than the cost of generating a second cuboid based on a mesh model of another object. That is, in computation processing of kinematics or inverse kinematics to cause the robot arm 16 to take a given position and posture, arbitrary coordinates that are obtained by rotating a reference coordinate system by a given angle is calculated for each movable shaft (joint) included in the robot arm 16. In this way, the posture of the robot arm 16 is calculated by computing arbitrary coordinates that can be used to generate a second cuboid. Therefore, because the arbitrary coordinates calculated for computing the posture of the robot arm 16 can also be used for processing for generating an approximated body using a second cuboid, the cost of generating second cuboids that approximate to the robot arm 16 is relatively small. Therefore, it is preferable that the robot arm 16 is approximated by second cuboids with which determination accuracy is improved relative to the first cuboid.

In this way, the computation unit 24 calculates a second cuboid robot model (robot data) in which second cuboids approximate to the respective focused parts based on a robot model expressed as a mesh or the like, the calculated robot model is stored in the storage device 26, and the processing in step S12 is ended. The generated robot data will be used in processing for generating a robot approximated body corresponding to a given posture that the robot arm 16 can take on a motion path, as will be described later. Note that, in an embodiment, a case has been described where the robot data is generated by approximating focused parts of the robot arm 16, but an end effector provided at a leading end of the robot arm 16 is approximated as a focused part in addition to the robot arm 16, and robot data including the focused parts of the robot arm 16 and the focused part of the end effector may be generated. Furthermore, a target object to be held by the end effector (work to be held, for example) is approximated as a focused part, and robot data including the focused parts of the robot arm 16, the focused part of the end effector, and the target object may be generated. Here, the end effector and the target object may be integrally approximated as one focused part. As a result of including the end effector that operates in accordance with the operation of the robot arm 16 to change the posture and a target object in the robot data, the accuracy in determining interference between the robot and an obstacle can be improved.

Note that the order of steps in an embodiment can be changed without departing from the spirit of the invention, and step S11 may be executed after step S12 or at the same time of step S12, for example.

Figure 10:
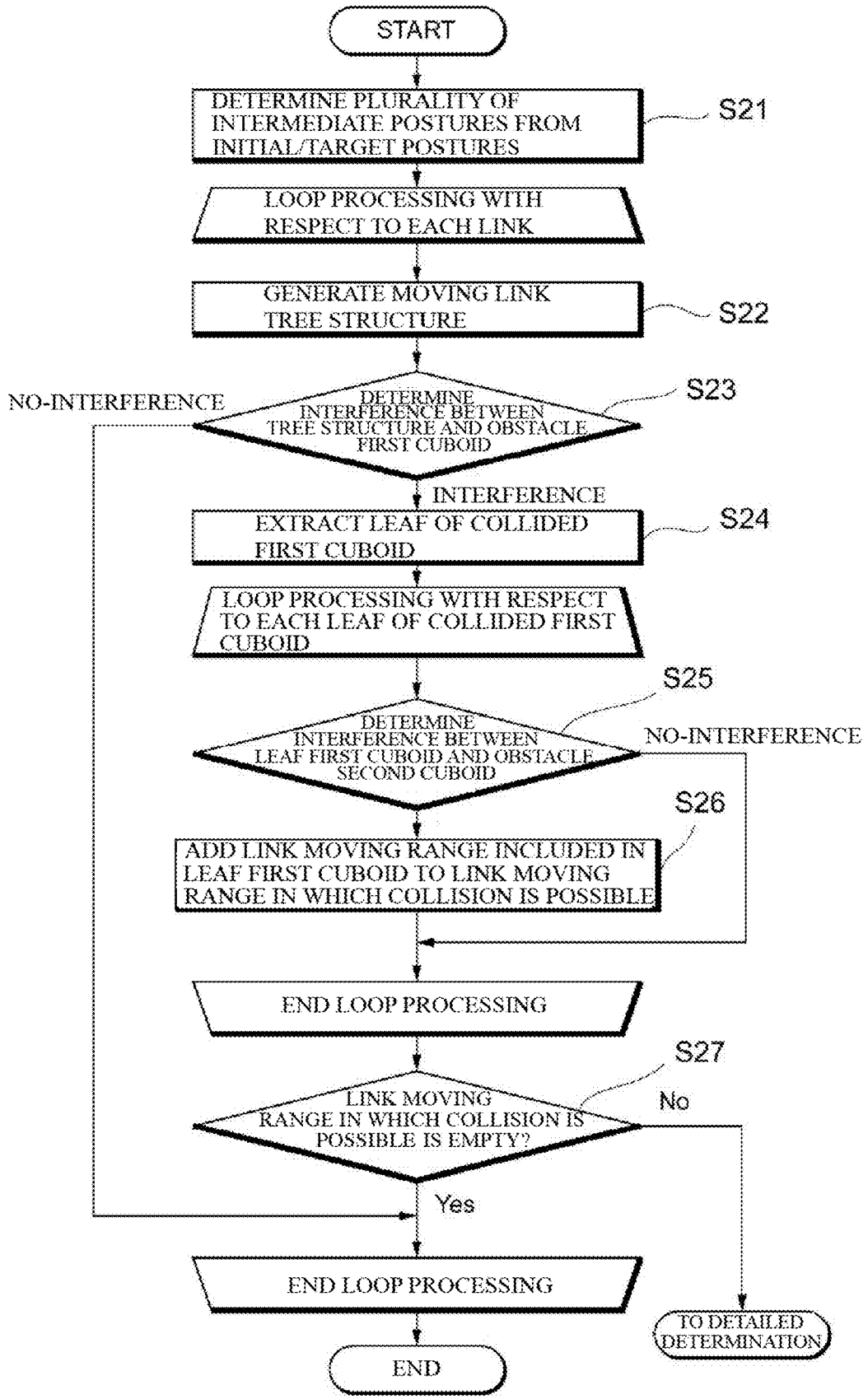
FIG. 10 is a flowchart illustrating an interference determination method according to a first embodiment.

After the above-described pre-processing, interference determination is executed. FIG. 10 shows a flowchart of an interference determination method using the interference determination system 10 in a first embodiment. Note that the flowchart shown in FIG. 10 describes a method in which approximated bodies are generated for each object with respect to obstacles (surrounding objects), and interference between the approximated bodies of the obstacles and a robot approximated body that is hierarchically structured (tree-structured) is determined, but the approximated bodies of the obstacles (surrounding objects) may be hierarchically structured (tree-structured).

First, in step S21, an intermediate posture (intermediate position) of the robot arm 16 is generated based on an initial posture (initial position) corresponding to a first position of the robot arm 16 and a target posture (target position) corresponding to a second position that are input from the input unit. Note that the initial posture (initial position) is not limited to a posture when the robot arm 16 remains still, but may be a posture at a point midway in a motion path. Similarly, the target posture (target position) is not limited to the posture that the robot arm ultimately takes, and may be a posture at a point midway in a motion path.

Figure 11:
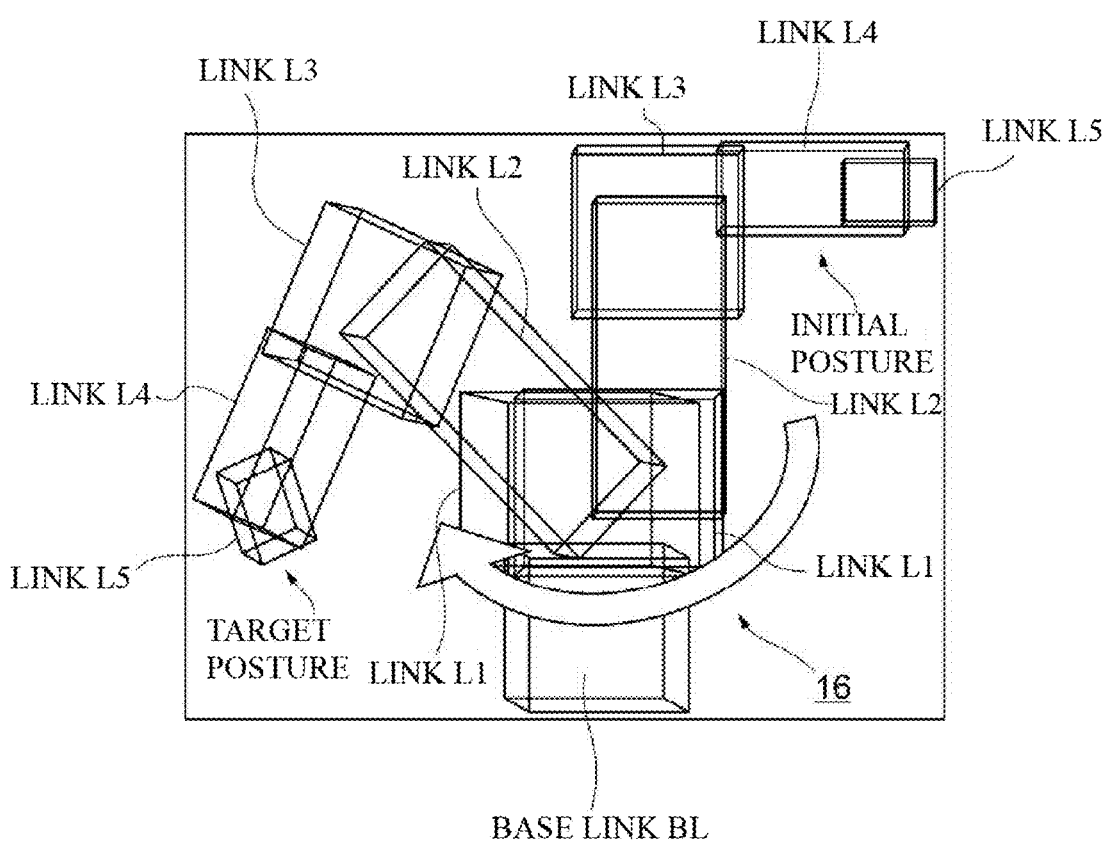
FIG. 11 is a diagram illustrating initial and target postures of an approximated body of a robot arm according to a first embodiment.

FIG. 11 shows second cuboids corresponding to the robot approximated body that approximate to the links L of the robot arm at the initial posture obtained in step S12, and second cuboids corresponding to the robot approximated body that approximate to the links L of the robot arm at the target posture.

Figure 12A:
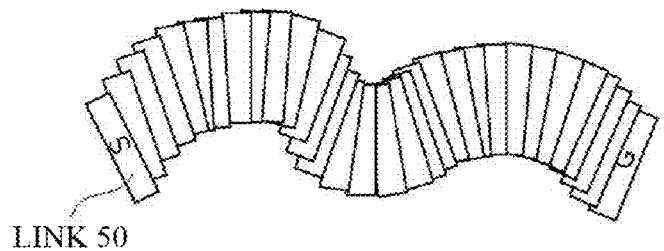
FIGS. 12A to 12D are diagrams illustrating a method of determining the number of intermediate postures in a first embodiment.
Figure 12B:
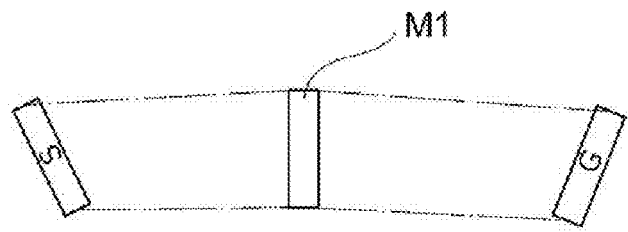
Figure 12C:
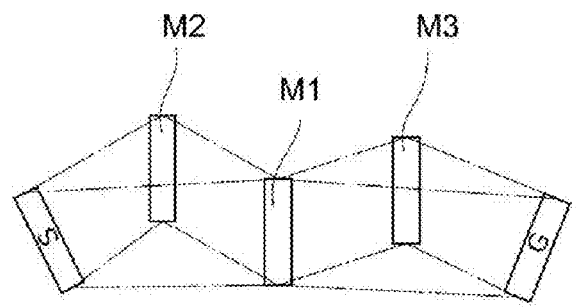
Figure 12D:
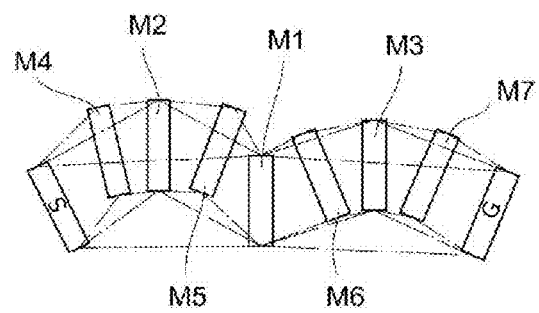

FIGS. 12A to 12D show a method of determining the number of intermediate positions (intermediate postures) to be set in order to appropriately determine whether a given focused part (link 50) will interfere with an obstacle in a course from the initial posture S at the start point to the target posture G at the end point while moving on a given motion path. Note that the motion path from the start point to the end point may be calculated using a known method, and a method of searching a path from the start point to the end point described in JP 2014-073550A, and a method of generating the path in which taught points that were taught to the robot arm 16 by an operator are connected using a known interpolation method can be adopted. FIG. 12A shows a manner in which the second cuboid of the link 50 moves along the motion path. FIG. 12B shows an example in which the number of intermediate postures is set to one, and the intermediate posture M1 is arranged between the start point (initial posture S) and the end point (target posture G). FIG. 12C shows an example in which the number of intermediate postures is set to three, a second intermediate posture M2 is arranged between the initial posture S and the intermediate posture M1, and the third intermediate posture M3 is arranged between the intermediate posture M1 and the target posture G. FIG. 12D shows an example in which the number of intermediate postures is set to seven, and intermediate postures M2, M4, and M5 are arranged between the initial posture S and the intermediate posture M1, and intermediate postures M3, M6, and M7 are arranged between the intermediate posture M1 and the target posture G.

In an embodiment, A (A is a natural number of one or more) intermediate postures M are provided between the initial posture S and the target posture G, an inter-link distance La between the initial posture S and the target posture G via the A intermediate postures M is calculated, and an inter-link distance Lb between the initial posture S and the target posture G that are connected via B intermediate postures M is calculated, B being larger than A. Then, the inter-link distance La is compared with the inter-link distance Lb, and whether or not the degree of change ΔL of Lb relative to La (at least one of change rate (Lb/La) and amount of change (Lb−La), for example) is below a predetermined given threshold value V. If the degree of change ΔL is less than the given threshold value V, the number of intermediate postures M is set to A. On the other hand, if the degree of change ΔL is greater than or equal to the given threshold value V, an inter-link distance Lc between the initial posture S and the target posture G that are connected via C intermediate postures M is calculated, C being larger than B, and whether or not the degree of change of Lc relative to Lb is less than the predetermined given threshold value V is determined. If the degree of change ΔL is less than the threshold value V, the number of intermediate postures M is set to B. On the other hand, if the degree of change is greater than or equal to the threshold value, an inter-link distance Ld is calculated by setting the number of intermediate postures M to D, which is larger than C.

As described above, an inter-link distance L is calculated by incrementing the number of intermediate postures M, the inter-link distances L before and after the number of intermediate postures M is incremented are compared, and the number of intermediate postures M is determined according to whether or not the degree of change is less than the threshold value V. Accordingly, the number of intermediate postures M can be appropriately set while sufficiently considering the moving path. In other words, the inter-link distance between the initial posture and the target posture via intermediate postures is calculated by changing the number of intermediate postures, calculated inter-link distances are compared, and the number of intermediate postures is changed based on an increase or decrease. As a result of the granularity of setting the intermediate postures being set such that the collision determination can be accurately performed, the determination accuracy can be improved.

Figure 13A:
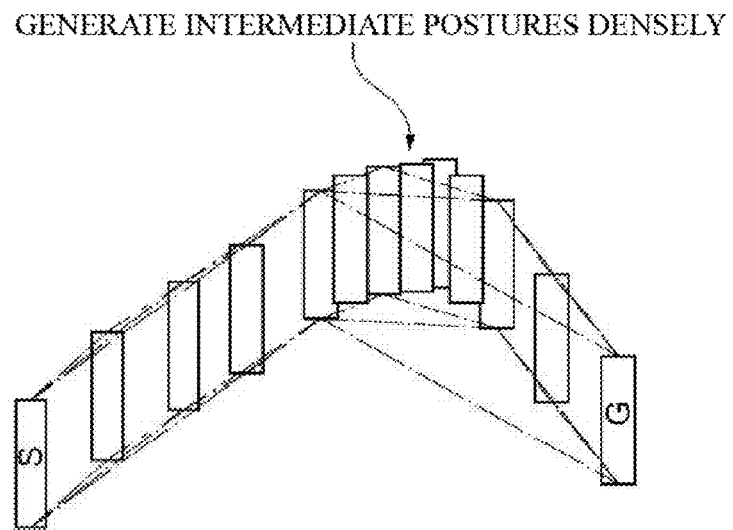
FIGS. 13A to 13C are diagrams illustrating a modification of a method of determining the number of intermediate postures in a first embodiment.
Figure 13B:
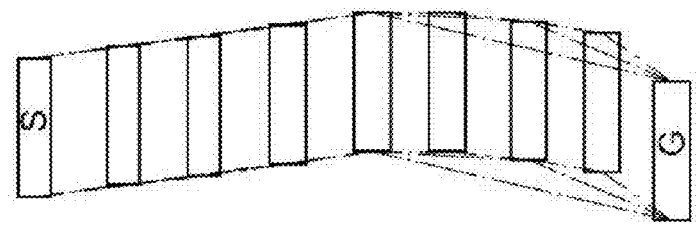
Figure 13C:
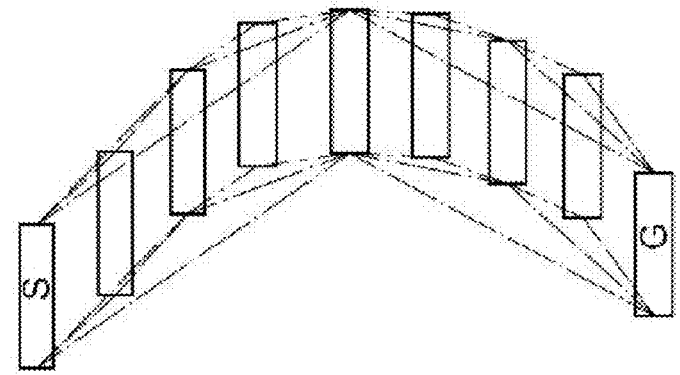

Note that the number of intermediate postures can be set using various methods. For example, the number may be a fixed value irrespective of the path. Alternatively, as shown in FIG. 13A, it is also possible that many intermediate postures are densely set in a region that is known to be closer to an obstacle, in advance, and a region in which the change amount of a link is large, and a small number of intermediate postures are coarsely set in a region far from the obstacle and a region in which the change amount of the link is small. Also, as shown in FIG. 13B, in the case where the amount of change in posture is relatively small in a first half portion closer to the start point on the motion path, and the amount of change in posture increases in a second half portion, many intermediate postures may be set in the second half portion in which the amount of change in posture is large, and the number of intermediate postures in the first half portion may be reduced, for example. Also, as shown in FIG. 13C, in the case where the amount of change is a given amount of change in both the first half portion and the second half portion, the same number of intermediate postures may be set. Also, the initial posture, the plurality of intermediate postures, and the target posture may be connected by curved lines of a given degree instead of straight lines. Note that setting a plurality of intermediate positions in an embodiment is not limited to a case where coordinates specifying the intermediate position are obtained, and generation of data corresponding to the intermediate postures corresponding to the plurality of intermediate positions is included.

Also, taught points, which are points designated by an operator, that indicate the coordinates of a leading end of the robot arm 16 and a leading end of the end effector may be set as the intermediate position (intermediate posture). Also, in the case where a computation equation that represents arbitrarily line segments (combination of curved lines and straight lines, and the like) is given as the path connecting the start point and the end point, arbitrary points are set on the line segments using the computation equation, and these points may represent the intermediate position (intermediate posture). Here, the arbitrary line segments connecting the start point and the end point can be set such that the start point and the end point are connected via taught points designated by the operator in advance.

Figure 14:
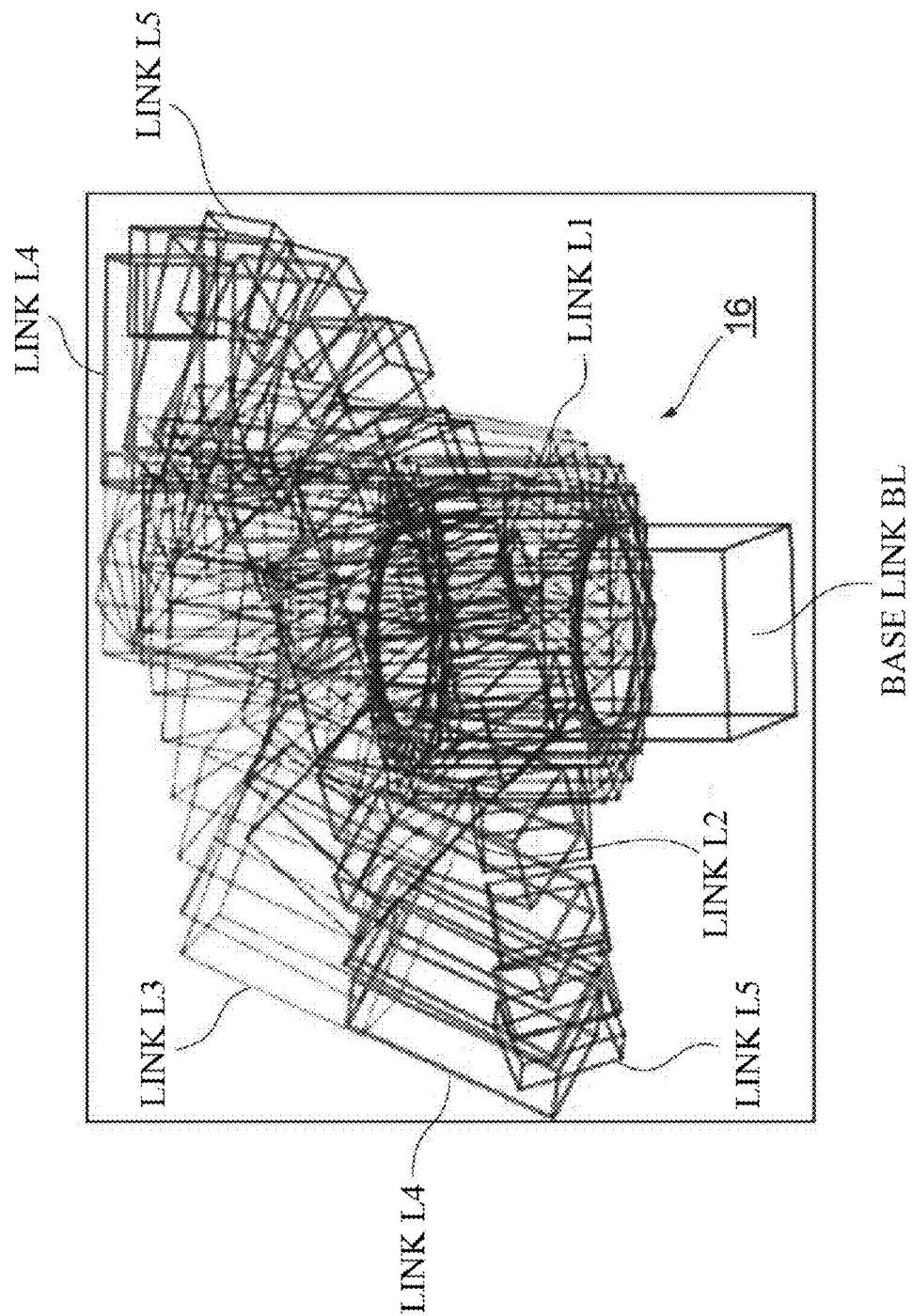
FIG. 14 is a diagram illustrating an initial posture, an intermediate posture, and a target posture of each of links of a robot arm according to a first embodiment that are expressed by second cuboid approximated bodies.

FIG. 14 shows second cuboids of the initial posture, the intermediate postures, and the target posture, for each link L, that are generated based on the number of intermediate postures that has been determined using the above-described method. It is shown that the amount of movement of the link L is smaller when the link L is located closer to the base link BL, which is a fixed part, and the amount of movement increases when the link L is located closer to the leading end of the robot arm 16.

Next, loop processing in which processing from step S22 until step S27 is repeated is executed with respect to the links L1 to L5, which are moving links of the focused parts. In an embodiment, first, processing in step S22 for generating a hierarchical structure (tree structure) constituted by first cuboids is executed with respect to the link L5. Note that the hierarchical structure (tree structure) may include second cuboids that have been generated with respect to the focused parts (links L) in the initial posture, the intermediate postures, and the target posture. Here, the second cuboids are preferably positioned as leaves that constitute a lowermost layer in the hierarchical structure (tree structure).

Next, a method of generating a first combined approximated body and a second combined approximated body from the robot approximated bodies that are generated with respect to the initial posture, the intermediate postures, and the target posture for each focused part will be described based on FIGS. 15 and 16.

As described above, the robot approximated body is generated by approximating the focused part using a second cuboid. In the present example, the first combined approximated body is generated by performing approximation so as to include a plurality of robot approximated bodies using a first cuboid. Furthermore, in the present example, the second combined approximated body is generated by performing approximation so as to include a plurality of first combined approximated bodies using a first cuboid. Note that a combined approximated body that is larger than the second combined approximated body may be generated by repeating processing in which a relatively large combined approximated body is generated by performing approximation so as to include a plurality of relatively small combined approximated body using a first cuboid. Note that the first cuboid and the second cuboid do not necessarily need to be used in the approximation method.

Figure 15:
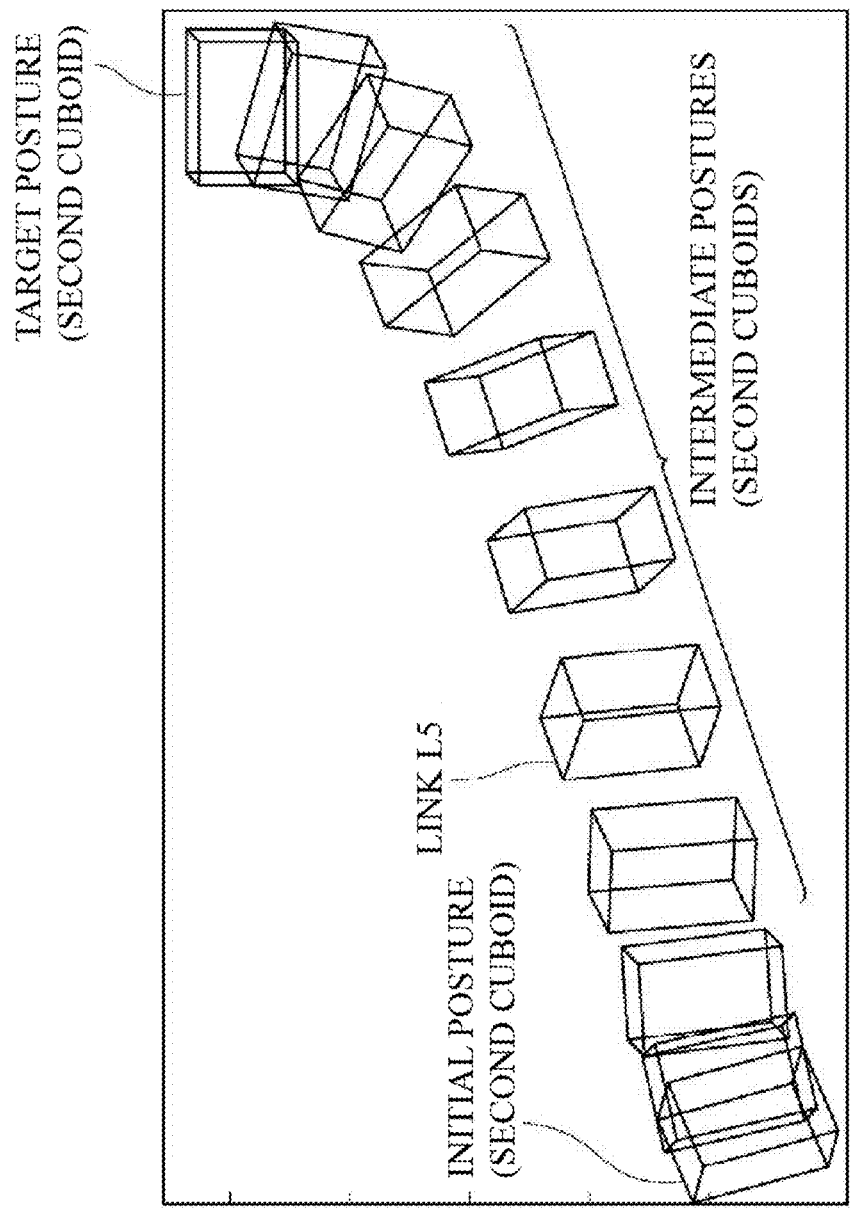
FIG. 15 is a diagram illustrating an initial posture, an intermediate posture, and a target posture of a link of a robot arm according to a first embodiment that are expressed by second cuboid approximated bodies.

FIG. 15 shows 11 second cuboid approximated bodies that respectively approximate to the initial posture, nine intermediate postures, and the target posture with respect to the link L5. Also, FIGS. 16(a) and (b) respectively show a plan view (XZ plane) and a perspective view of first cuboids generated by combining these second cuboids and a hierarchical structure (tree structure) of the generated plurality of first cuboids.

In step S22, first, two adjacent second cuboids are combined, and a first cuboid that includes them is generated. Here, first cuboids are generated such that the space (gap) between any two adjacent second cuboids is included in at least one of the first cuboids. As a result of generating the first cuboids in this way, the interference determination can be performed with respect to the region in which the link L5 moves from the initial posture to the target posture via the intermediate postures without a gap, and the determination accuracy is improved.

Figure 16A:
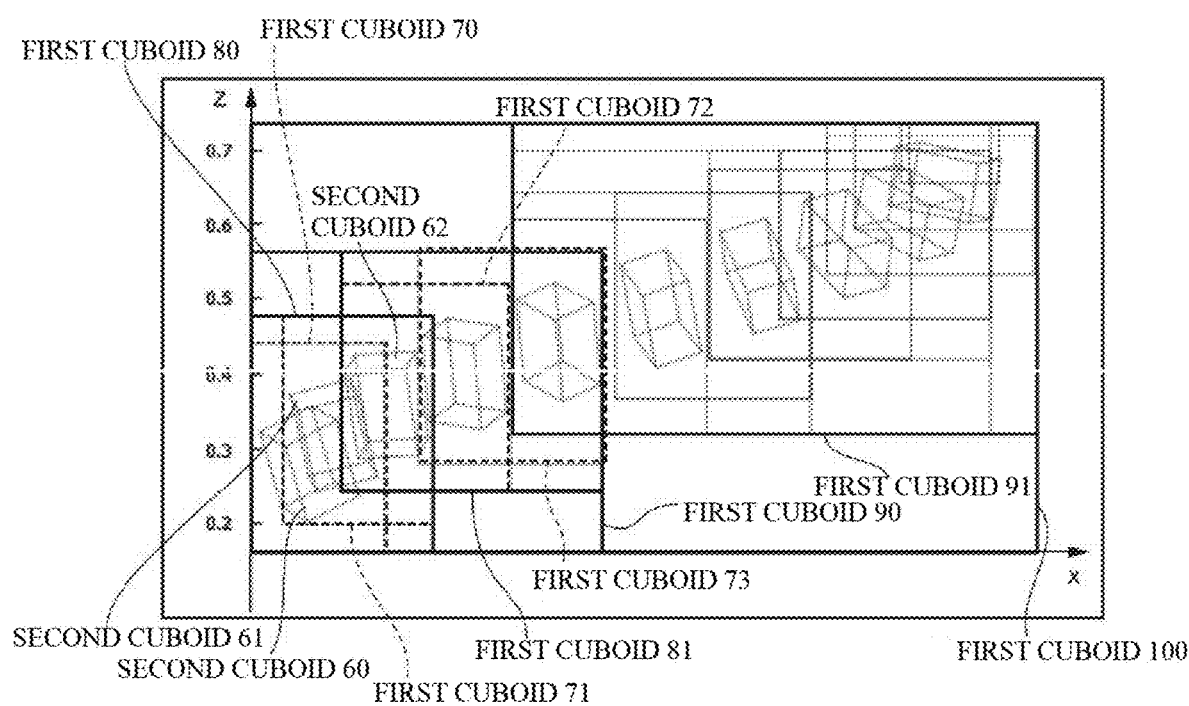
FIGS. 16A and 16B are diagrams illustrating first cuboids that includes second cuboids based on a diagram, such as in FIG. 15.
Figure 16B:
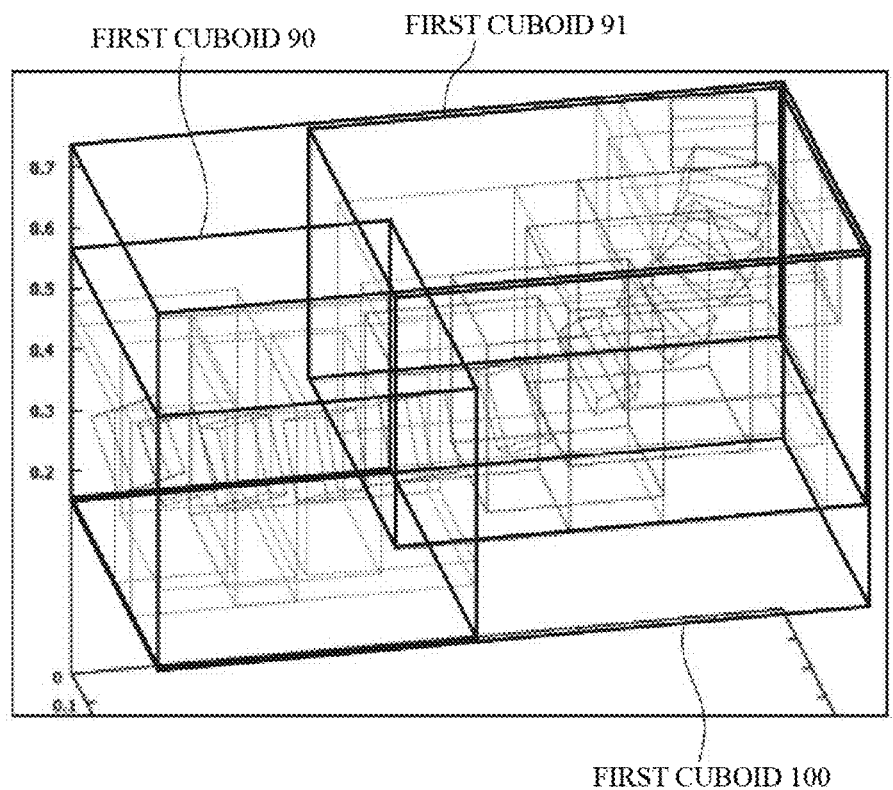

FIG. 16A shows a manner in which two adjacent second cuboids 60 and 61 are combined, and a first cuboid 70 that includes them is generated, and similarly, two adjacent second cuboids 61 and 62 are combined, and a first cuboid 71 that includes them is generated. Similarly, two adjacent second cuboids are combined, and a first cuboid that includes them is generated, and a plurality of first cuboids (first combined approximated bodies) that constitute the lowermost layer (fourth layer) of the first cuboids, of the hierarchical structure (tree structure), are generated. Note that one first cuboid may be generated from three or more adjacent second cuboids. Also, the first cuboid need not be in contact with a second cuboid, and may be generated so as to include a plurality of second cuboids with a margin.

Next, first cuboids (second combined approximated bodies) in a third layer, which is an upper layer of the lowermost layer, are generated by combining adjacent first cuboids, out of the generated plurality of first cuboids (first combined approximated bodies). As shown in FIG. 16A, a first cuboid 80 is generated by combining the first cuboids 70 and 71, and a first cuboid 81 is generated by combining the first cuboids 72 and 73, and the like. In this way, the plurality of first cuboids (second combined approximated bodies) that forms the third layer are generated.

Next, the first cuboids 80 and 81 are combined to generate a first cuboid 90 as a second layer first cuboid, and the like. Furthermore, first cuboids 90 and 91 are combined to generate a first cuboid 100 as an uppermost layer. This first cuboid 100 is a first cuboid that includes all the 11 second cuboids with respect to the link L5, which is the focused part. The above-described processing is executed using the CPU 24 and the memory 28, the hierarchical structure (tree structure) constituted by the first cuboids generated as described above is stored in the storage device 26, and as a result, processing in step S22 for generating a hierarchical structure (tree structure) constituted by first cuboids with respect to the link L5 is completed.

Note that the first cuboids (first cuboids 90 and 91) in the second layer and the first cuboid (first cuboid 100) in the first layer are relatively large combined approximated bodies that are each generated by performing approximation using a first cuboid so as to include a plurality of relatively small combined approximated bodies. Therefore, the first cuboids in the second layer and the first cuboid in the first layer each correspond to the second combined approximated body. Also, the first cuboids (first cuboids 90 and 91) in the second layer are each a combined approximated body generated by performing approximation using a first cuboid so as to include a plurality of second combined approximated bodies, and therefore, each correspond to a third combined approximated body. Also, the first cuboid (first cuboid 100) in the first layer is a combined approximated body generated by performing approximation using a first cuboid so as to include a plurality of third combined approximated bodies, and therefore, corresponds to a fourth combined approximated body.

Next, in step S23, the first cuboids that constitute the hierarchical structure (tree structure) constituted by the first cuboids generated in step S22 are compared with the first cuboid of the obstacle generated in the pre-processing so as to determine whether or not interference may occur. Here, determining whether or not interference between the robot and the surrounding object may occur refers to determining whether or not the robot will interfere with a surrounding object using estimation in a virtual space using approximated bodies of the robot and the surrounding object.

Figure 17A:
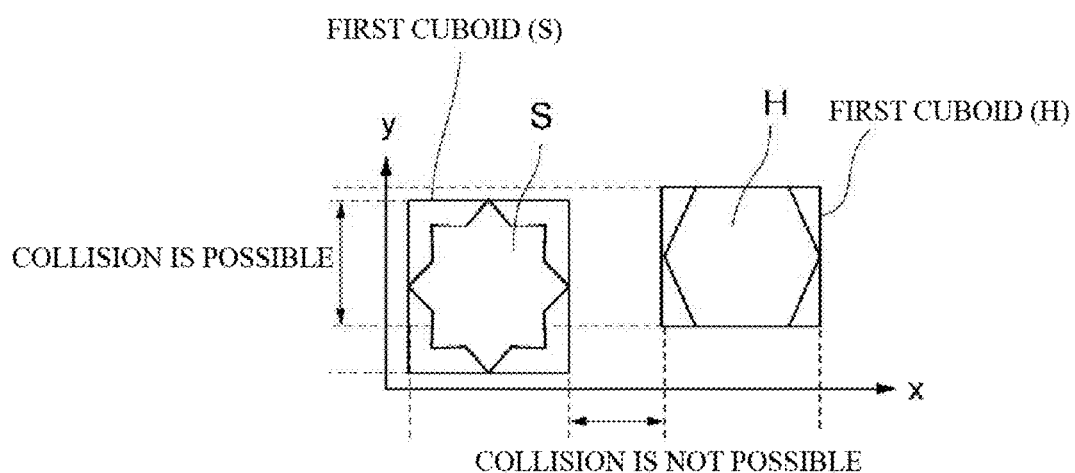
FIGS. 17A to 17C are diagrams for describing an interference determination method with respect to a first cuboid.
Figure 17B:
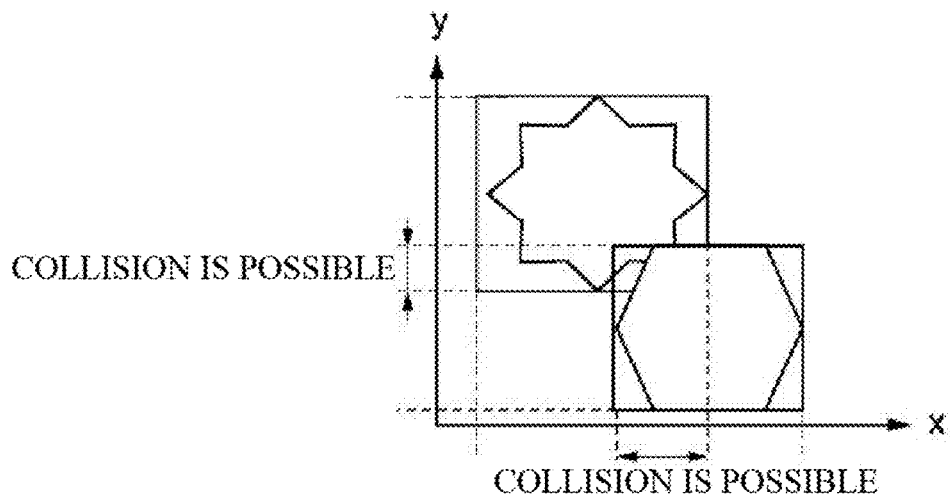
Figure 17C:
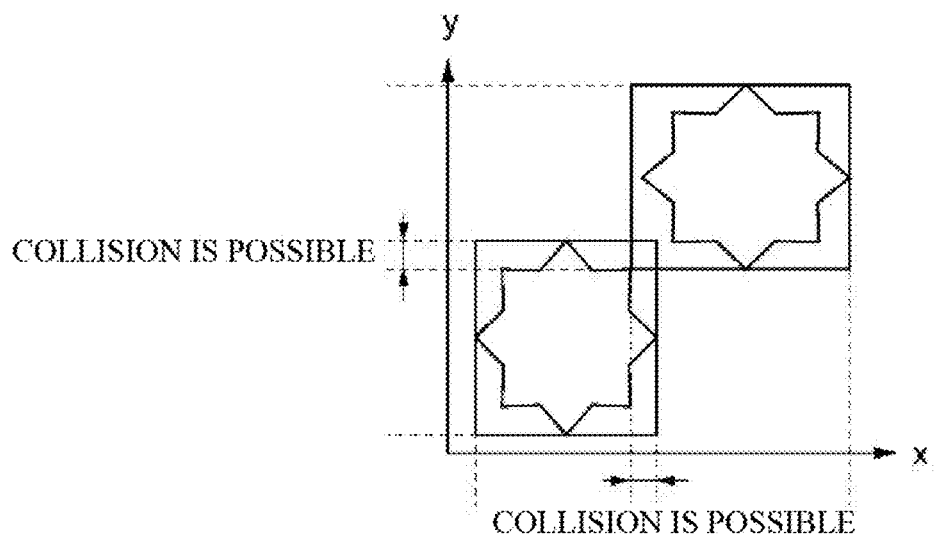

FIGS. 17A to 17C schematically show a method of determining interference between first cuboids using a two-dimensional coordinate system. In an embodiment, this method of determining interference can be used as a method of determining interference between the combined approximated bodies generated using first cuboids with respect to a robot and the surrounding object approximated body generated using a first cuboid with respect to an obstacle (surrounding object). As shown in the diagram, whether or not a first cuboid (H) that approximates to a hexagon H interferes with a first cuboid (S) that approximates to a star-shape S can be determined by comparing maximum values and minimum values of the first cuboids in each of the axes. In FIG. 17A, with respect to the Y axis, the position of the first cuboid (H) in the Y axis (that is, between maximum value and minimum value) overlaps the position of the first cuboid (S) in the Y axis, and therefore the probability of interference cannot be denied only by determination with respect to the Y axis. However, in the X axis, because the minimum value of the first cuboid (H) in the X axis is larger than the maximum value of the first cuboid (S) in the X axis, the two cuboids are separated in the X axis, and therefore, it can be determined that the hexagon H will not interfere with the star-shape S. On the other hand, in the case of FIG. 17B, because overlapping regions exist both in the X axis and in the Y axis, the first cuboids interfere with each other, and as a result, it is determined that it is possible that the hexagon H will interfere with the star-shape S. Note that, in the case of FIG. 17C, although the hexagon H itself and the star-shape S itself do not interfere, because the first cuboid (H) that approximates to the hexagon H and the first cuboid (S) that approximates to the star-shape S have an overlapping region, it is determined that the hexagon H may interfere with the star-shape S. Here, in determining interference between the robot arm 16 and the surrounding object (obstacle), it is preferable that erroneous determination in which no-interference is determined in spite of the fact that interference actually will occur is reliably prevented from occurring in order to improve safety. In this regard, with the method in an embodiment, although there is a risk that erroneous determination may occur in which interference is determined even if interference will not actually occur, it is possible that erroneous determination in which interference is determined as no-interference can be reliably prevented from occurring, as shown in FIG. 17C. As described above, as a result of approximating objects such as a robot and a surrounding object using first cuboids, it is possible to determine whether or not interference may occur at high speed based on only position information of the objects in each of the coordinate axes (X axis, Y axis, and Z axis in the case of three-dimensional rectangular coordinate system).

With the method as described above, it is determined whether interference may occur between first cuboids that constitute the hierarchical structure (tree structure) with respect to the robot approximated body and the first cuboid of the obstacle, in step S23. Here, first, it is determined whether or not the first cuboid 100, which is the largest first cuboid that constitutes the uppermost layer of the hierarchical structure (tree structure) with respect to the robot approximated body, will interfere with the first cuboid of the obstacle. If it is determined that the cuboids do not interfere, because it can be determined that it is not possible that the robot will interfere with the obstacle, determination as to whether or not other first cuboids in lower layers in the hierarchical structure (tree structure) with respect to the robot approximated body interfere with a first cuboid of the obstacle can be omitted. On the other hand, if it is determined that the cuboids interfere, it is determined whether or not the first cuboids 90 and 91, in a layer that is one level lower in the hierarchical structure (tree structure) with respect to the robot approximated body, interfere with the first cuboid of the obstacle. Note that, as described above, an obstacle (surrounding object) is approximated by a given method (such as a first cuboid, a second cuboid, and a convex hull), and the approximation may further be hierarchically structured (tree structure). In this case, determination is performed by lowering the level with respect to the obstacle, and it is determined whether or not there is interference.

Similarly, with respect to the first cuboid of the robot that has been determined to interfere with the first cuboid of the obstacle, it is determined whether or not the first cuboids in a layer lower than the layer of the first cuboid of interest interfere with the first cuboid of the obstacle. If it is determined that no first cuboid in the lowermost layer (corresponding to leaves of the hierarchical structure (tree structure) constituted by the first cuboids with respect to the robot) interferes with the first cuboid of the obstacle, the loop processing with respect to the link L is ended. On the other hand, if it is determined that any of the first cuboids in the lowermost layer interferes with the first cuboid of the obstacle, the first cuboid of the robot for which interference has been determined is extracted (step S24). Note that the hierarchical structure (tree structure) with respect to the robot approximated body may be set to have only two layers, as described above, and if it is determined that interference will occur using the largest first cuboid in the hierarchical structure, it may be determined whether or not each of the minimum first cuboids (that is, 10 first cuboids generated by combining two adjacent second cuboids with respect to 11 second cuboids) interferes with the first cuboid of the obstacle.

Figure 18B:
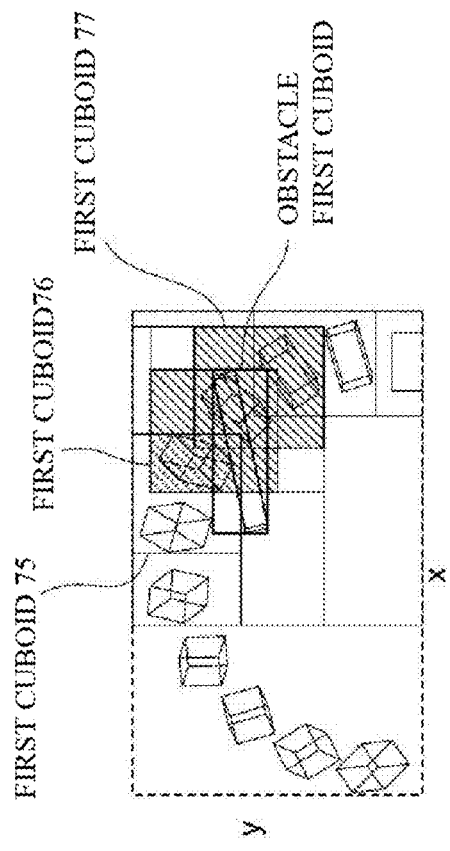
FIGS. 18A to 18C are diagrams illustrating a situation in which a link of a robot arm according to a first embodiment interferes with a first cuboid.
Figure 18C:
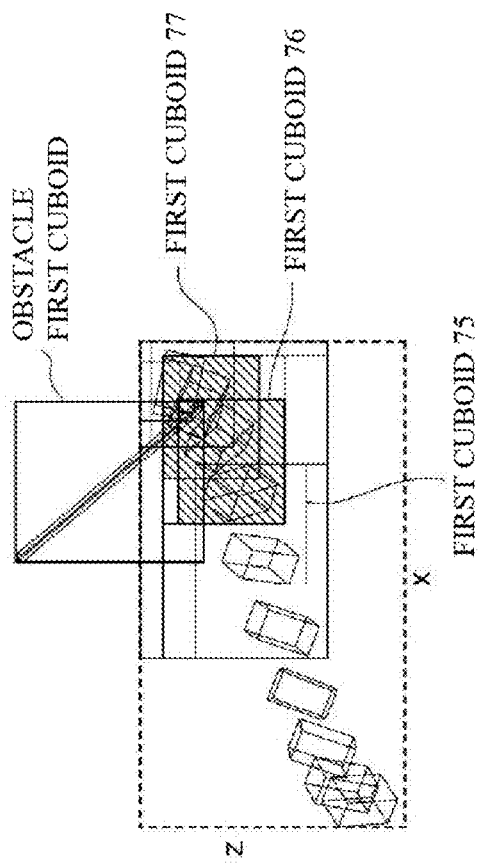
Figure 18A:
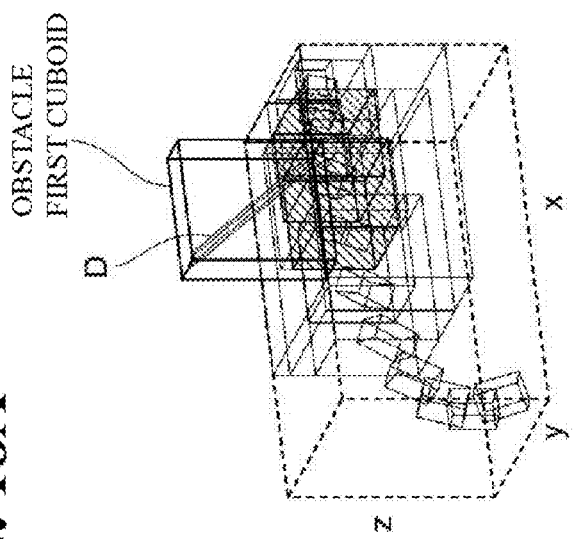

In this way, the first cuboid of the robot that collides with the first cuboid of the obstacle is extracted. FIGS. 18A to 18C show a manner in which it has been determined that a first cuboid of an obstacle that is generated based on a second cuboid of the plate-shaped obstacle D collides with a first cuboid 75, a first cuboid 76, and a first cuboid 77 that each include an overlapping region therewith with respect to coordinate axes, out of first cuboids included in the lowermost layer of the hierarchical structure (tree structure) constituted by first cuboids that approximate to the robot.

Next, the loop processing from step S25 to step S26 is executed with respect to the first cuboid 75, the first cuboid 76, and the first cuboid 77 that have been extracted in the above-described step.

First, processing for determining interference between the second cuboid of the obstacle D and the first cuboid 75 with respect to the robot is executed. The interference between a first cuboid and a second cuboid can be determined by comparing the first cuboid projected on a XY plane with the second cuboid projected on the XY plane, comparing the first cuboid projected on an XZ plane and the second cuboid projected on the XZ plane, and determining whether or not an overlapping region exists, but, in addition to this, determination processing may be executed using various types of known methods. As shown in FIGS. 18(*b*) and (*c*), the first cuboid 75 with respect to the robot has an overlapping region in the XY plane, but is separated from the second cuboid of the obstacle in the XZ plane, and therefore, it is determined that the first cuboid 75 does not interfere with the second cuboid of the obstacle. On the other hand, the first cuboids 76 and 77 with respect to the robot each have an overlapping region with the second cuboid of the obstacle in both planes, and therefore, it is determined that the first cuboids 76 and 77 interfere with the second cuboid. With respect to the first cuboids 76 and 77 that have been determined to interfere with the second cuboid of the obstacle, information regarding the fact that the interference is stored in the storage device 26, and the moving range of the link L that is included in the first cuboid for which interference has been determined is registered and stored in the storage device 26 as the link moving range in which collision may occur (step S26). After the loop processing of steps S25 and S26 is completed, it is determined whether or not a link moving range in which collision may possibly occur is registered (step S27), if not registered, a series of processing with respect to the link L is ended, and processing starting from step S22 will be repeated for the next link L. If it is determined that a link moving range in which collision may possibly occur is registered in step S27, detailed determination with respect to the range is executed, and the collision point is specified.

Various types of methods including a known method can be used to specify the collision point. In an embodiment, with respect to the link L that may collide, points at which collision with the surrounding object will occur in a space, in the link moving range in which collision may occur, between the posture at the start point and the posture at the end point, are extracted using a known method, and processing in which parameters (x, y, z, α, β, γ) of the position and posture of the robot or the link L at that time is calculated is executed.

Note that, in an embodiment, the hierarchical structure (tree structure) constituted by first cuboids that each approximates to a focused part of the robot arm 16 is generated by the BVH, and interference determination is executed by comparing the hierarchical structure with the first cuboid of the obstacle and the second cuboid of the obstacle, but it is possible to use various types of approximated bodies instead of the first cuboid, and a convex hull can be used as well. In the following, a method of generating the convex hull, and the difference in effects when the first cuboid and the convex hull are adopted in an embodiment will be described.

FIGS. 19A to 19F show a method of generating the convex hull. As described above, the convex hull refers to a minimum convex polygon (or polyhedron) that includes a plurality of points that exist in the coordinate system. For example, the convex hull of a point set shown in FIG. 19A is generated using a method described below. That is, first, a straight line (or flat plane) that passes through two arbitrary points (point A and point B) is defined (FIG. 19B). Then, points (point C and point D) whose distance from the straight line (or flat plane) is the maximum are determined respectively in the upper and lower regions relative to the straight line (FIG. 19C), these points are connected by ridge lines (or planes), and the points inside the region surrounded by the ridge lines are removed from the processing target (FIG. 19D). Furthermore, a point E whose distance from the ridge lines (or planes) is the largest, out of the points outside the region, is specified, and is connected by ridge lines (or planes) (FIG. 19E). The convex hull can be generated by repeating this processing (FIG. 19F).

Accordingly, convex hulls whose point sets each include vertices of adjacent second cuboids in place of the first cuboids each created by combining adjacent second cuboids with respect to a given focused part in an embodiment are generated, a convex hull is further created by combining these convex hulls, a hierarchical structure of convex hulls is generated, and whether or not interference with an obstacle will occur may be determined. Also, it is also possible to realize highly accurate determination in which, a convex hull of an obstacle is generated in place of generating an obstacle first cuboid or an obstacle second cuboid, and the convex hull of the obstacle is used only when interference with the first cuboid of the obstacle or the second cuboid of the obstacle occurs. The interference determination using the convex hull can use various types of known methods.

Effects of the determination system according to an embodiment will be described in the following. First, after generating approximated bodies that approximate to, as polyhedrons, the shape of a focused part of the robot with respect to a start point, a plurality of intermediate points, and an end point, instead of using these approximated bodies directly, approximated bodies each combine at least two approximated bodies, and a large combined approximated body that combines a plurality of approximated bodies generated through such combining are generated, and interference with the obstacle is determined stepwise using these approximated bodies, and as a result, high speed determination processing can be realized.

In other words, an approximated body that combines a relatively small number of approximated bodies and an approximated body that combines a relatively large number of approximated bodies are generated, and a hierarchical structure (tree structure) according to the number of combined approximated bodies is generated, and thereafter, interference determination is executed using the hierarchical structure (tree structure), and as a result, processing for unnecessary interference determination with respect to an approximated body can be removed, and high-speed determination processing can be realized.

Specifically, the following effects can be exhibited when the first cuboid is used in determination relative to the case of the convex hull.

That is, as shown in FIG. 4, when the first cuboid is used, the generation cost is small, in general, relative to a case where the convex hull is used, although the cost changes according to the number of points used to specify the convex hull. Also, the processing for interference determination using the convex hull takes one millisecond or more, in general. Therefore, the time it takes to perform interference determination when the convex hull is used is at least one millisecond or more. On the other hand, since the first cuboid can be generated based on position information in each coordinate (three-dimensional position information of at least two vertices that constitute the first cuboid, for example), and interference determination becomes possible, the generation cost of the first cuboid is small relative to the convex hull, and the processing for interference determination can be realized in the order of nanoseconds, and therefore determination speed is expected to substantially increase.

Also, since it takes time to generate a convex hull, approximated bodies that each combine convex hulls have to be generated discretely at sufficient time intervals, but because a robot performs not only a linear motion but also a curvilinear motion, it is possible that problems shown in FIGS. 20A and 20B will occur. FIG. 20A shows a case where, in spite of the fact that no-interference has been determined in interference determination using the convex hull, the robot will actually interfere with the obstacle, and FIG. 20B shows a case where, to the contrary, in spite of the fact that interference has been determined in interference determination using the convex hull, the robot will not actually interfere with the obstacle.

As shown in the diagram on the left side in FIG. 20A, a convex hull (dotted line) formed by a point set that constitutes two postures does not interfere with an obstacle D, and as a result, it is determined that the robot R will not interfere with the obstacle D. However, if the actual robot R performs a curvilinear motion and moves out of the convex hull, and the obstacle D exists in the region out of the convex hull, as shown in the diagram on the right side, in spite of the fact that no-interference has been determined as the result, interference will actually occur. On the other hand, in the case of FIG. 20B, as shown in the diagram on the left side, the convex hull (dotted line) interferes with the obstacle D, and therefore interference is determined as the result. However, if the actual robot performs a curvilinear motion and moves so as to evade the obstacle, as shown in the diagram on the left side, in spite of the fact that interference has been determined, interference will not actually occur. Therefore, in the case of performing interference determination using the convex hull, both cases may occur, namely a case where, although interference will not actually occur, interference is determined, and conversely, a case where, although interference will actually occur, no-interference is determined.

Figure 21A:
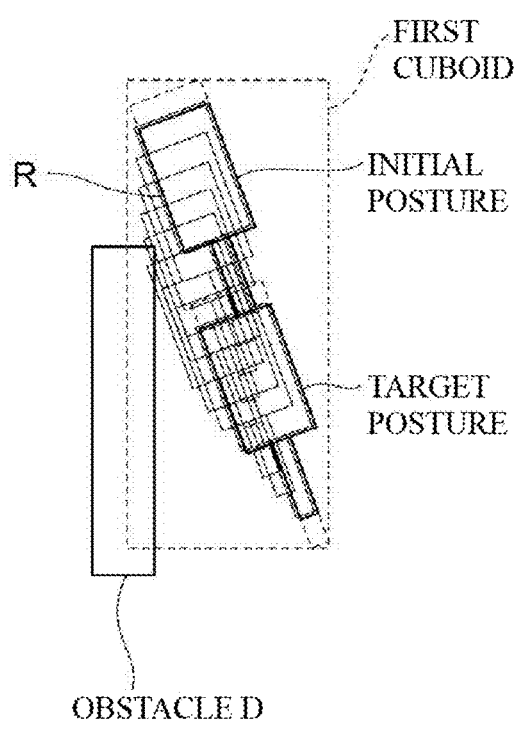
FIGS. 21A and 21B are diagrams illustrating a determination error based on a first cuboid.
Figure 21B:
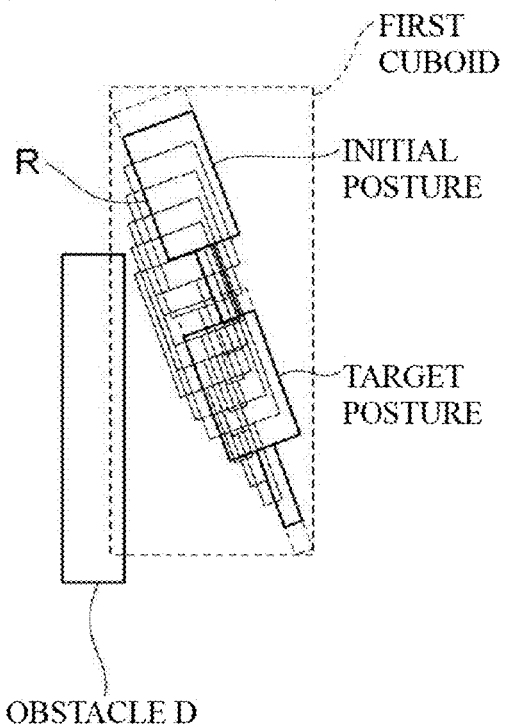

On the other hand, in the case of determination using a first cuboid, since the first cuboid can be generated so as to include two approximated bodies, although not only a case where it is determined that interference is possible and interference will actually occur as shown in FIG. 21A, but also a case where in spite of the fact that it has been determined that interference is possible, interference will not actually occur as shown in FIG. 21B will occur, a case where in spite of the fact that it has been determined that interference is not possible, interference will actually occur can be excluded. Specifically, when the first cuboid is generated so as to include postures of the object with a sufficient margin, the probability that a case where in spite of the fact that it has been determined that interference is not possible, interference will actually occur will occur can be reduced to substantially zero. Furthermore, if it has been determined that interference is not possible with respect to a first cuboid included in an upper layer in the hierarchical structure (tree structure) that has been generated using first cuboids, determination need not be performed with respect to first cuboids in a layer under the first cuboid, and therefore, it is expected that the processing speed can be increased. Also, since the first cuboid can be easily generated, many first cuboids considering intermediate postures at a sufficient number of intermediate positions can be generated, and as a result, interference determination corresponding to a curvilinear motion of the robot is made possible. Also, as a result of selectively executing detailed time-taking determination processing with respect to only the region in which it has been determined that interference is possible, interference determination processing can be optimized.

Note that the order of steps in an embodiment can be changed without departing from the spirit of the invention. For example, the step in which information regarding an initial posture and a target posture is input as input data may be executed at any timing prior to the timing at which the information is used. Information needs only be input, via a given interface, so as to be finally processed by a processor that constitutes a computation unit, and a configuration may be adopted in which information is automatically input using a given computer program or the like, for example. For example, the processing of a step in which information regarding the initial posture and the target posture is input as input data may be realized by automatically acquiring information acquired by an unshown sensor using a given computer program. Specifically, for example, a current position and/or posture of a given workpiece, which is the target of work by the robot arm 16, and a mounting position of the workpiece and/or posture are calculated based on image information acquired by an image capturing device, and information regarding the calculated initial posture and target posture may be input as input data.

Also, with respect to the approximated body of an obstacle, after interference determination has been performed using a maximum approximated body that includes the obstacle, using approximated bodies (first cuboids, for example) obtained by dividing the obstacle into a plurality of focused parts, interference may be determined between the robot approximated body and an approximated body of a given focused part or approximated bodies of the focused parts. In this way, a part of the obstacle for which interference is possible can be specified with high accuracy. Also, instead of generating an approximated body such as a first cuboid that includes all the obstacles so as to be used in interference determination, an approximated body such as a first cuboid is generated for each obstacle, and interference determination may be executed with respect to each of the approximated bodies of the obstacles and the robot.

Second Embodiment

Figure 22:
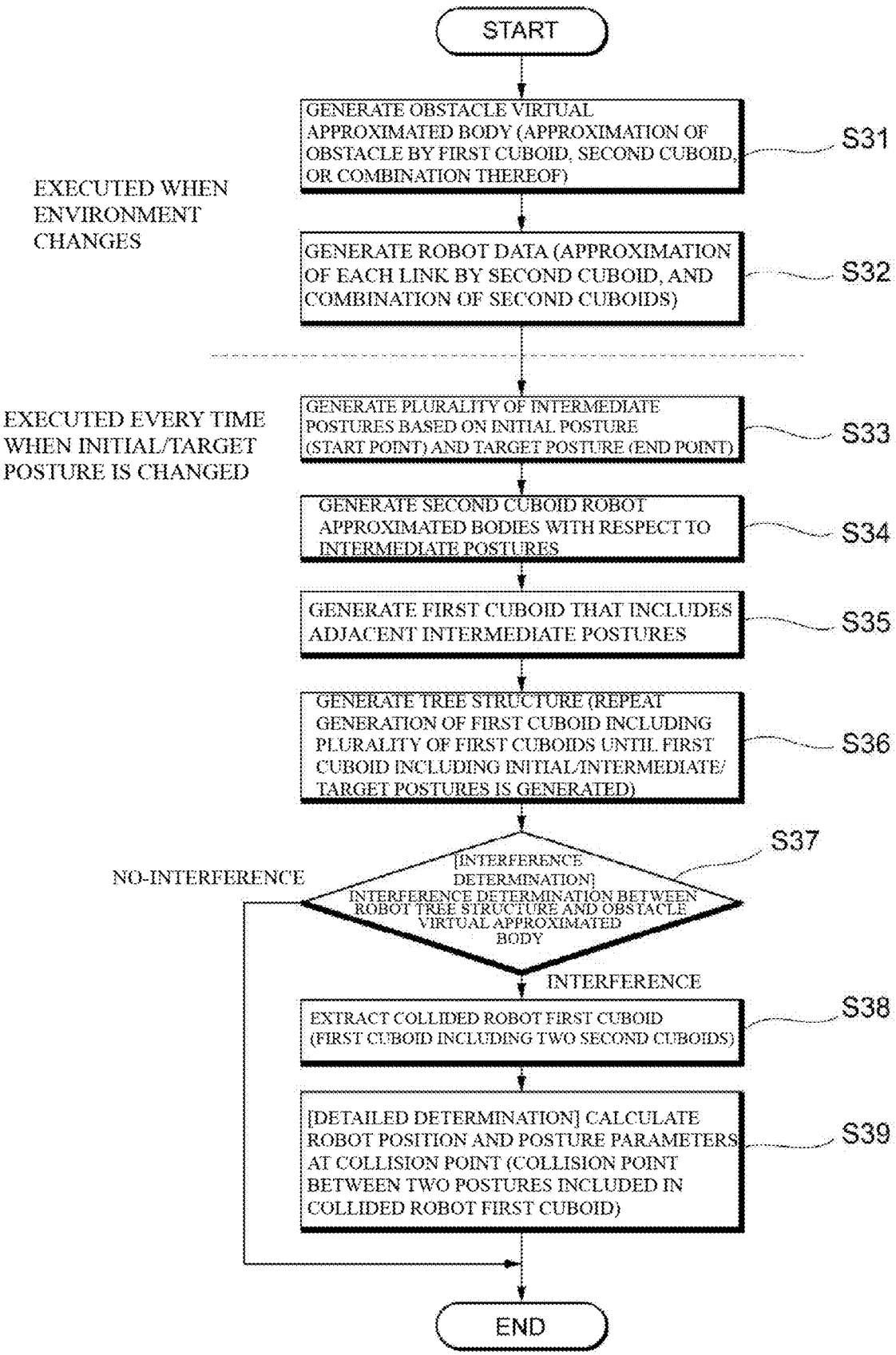
FIG. 22 is a flowchart illustrating an interference determination method according to a second embodiment.

FIG. 22 shows a flowchart of determination processing according to a second embodiment. Note that description of processing similar to the determination processing according to a first embodiment will be omitted.

The processing in steps S31 and S32 is processing to be executed every time the environment is changed. For example, the processing is re-executed when a nearby obstacle is changed.

Here, in step S31, with respect to a virtual approximated body of the obstacle, an approximated body of the obstacle can be generated using not only one of the first cuboid and the second cuboid, but also a combination of the first cuboid and the second cuboid, and another approximated body such as a convex hull.

Next, in step S32, robot data that expresses the robot using second cuboids that represent respective links L, which are focused parts, is generated. Here, because each focused part of the robot can be easily defined using a coordinate system constituted by axes (rotation axis and the like) defined by a motor and the like, an approximated body constituted by a second cuboid can be easily generated based on the coordinate axes. In the case of generating a first cuboid, computation processing using a rotation conversion matrix is further required, which complicates the processing, and therefore, it is preferable to use the second cuboid to generate approximated bodies of focused parts of a robot.

Thereafter, processing in step S33 and onward is executed every time the initial posture or the target posture is changed (every time interference determination is performed with respect to a path between different points).

First, in step S33, intermediate postures are generated. The number of intermediate postures (determination of resolution) can be determined using the following steps (1) to (5), in addition to using a method described above, for example.

(1) A plurality of intermediate points are set between different points (between start point and end point) at a given intervals, in advance.

(2) Next, a total path length (L) from the start point to the end point via the plurality of intermediate points is calculated.

(3) A plurality of intermediate points are set between the different points at intervals, the interval being smaller than the given interval.

(4) Next, the link path length (L') from the start point to the end point via the plurality of intermediate points is calculated.

(5) Thereafter, the change rate between L and L' is calculated, and if the change rate is less than a given threshold value, the processing is ended, and the number of intermediate points in step (2) is determined as the number of intermediate postures. If the change rate is not less than the given threshold value, the steps (1) to (4) are executed with a smaller interval, and the plurality of intermediate postures are determined based on the interval with which the change rate becomes less than the threshold value.

Processing in step S34 (generation of robot approximated bodies using second cuboids at respective intermediate postures), step S35 (generation of first cuboid that include adjacent second cuboids), and step S36 (generation of a hierarchical structure (tree structure) constituted by first cuboids by executing processing for combining a plurality of first cuboids generated in a previous step until a first cuboid that includes all the initial posture, the intermediate posture, and the target posture are included) is similar to that described in a first embodiment, and therefore the description thereof will be omitted. Note that the hierarchical structure (tree structure) may include a second cuboid that has been generated with respect to a focused part (link L) in the initial posture, the intermediate posture, and the target posture. Here, it is desirable that the second cuboid is positioned as a leaf that constitutes the lowermost layer in the hierarchical structure (tree structure).

Next, processing for determining interference between the hierarchical structure (tree structure) of the robot constituted by first cuboids and the virtual approximated body of the obstacle, in step S37, will be described using FIG. 23. FIG. 23 shows a hierarchical structure (tree structure) tree of the robot.

As shown in the diagram, the uppermost layer of the hierarchical structure (tree structure) is constituted by a first cuboid that includes second cuboids of all the postures, the second cuboids being second cuboids of the initial posture at the start point VS, second cuboids of the respective intermediate postures at intermediate points Vn (n is a natural number), and second cuboids of the target posture at the end point VG.

Then, if the first cuboid of the uppermost layer interferes with the obstacle, it is determined whether or not first cuboids in a layer lower than the uppermost layer interfere with the obstacle, and if interference is determined, processing for determining interference between first cuboids in a layer below the layer that includes the first cuboid with respect to which interference has been determined and the obstacle is executed.

This processing is repeated while the layer in which the target first cuboid is included is shifted to a lower layer in the hierarchical structure (tree structure), if a first cuboid of the first cuboids in the lowermost layer (first cuboids generated by combining adjacent second cuboids on the motion path, and in a layer second from the bottom in FIG. 23) interferes with the approximated body of the obstacle, the first cuboid (the first cuboid including second cuboid approximated bodies of the intermediate postures at V1 and V2 in the diagram) is extracted (step S38).

Thereafter, detailed determination is executed, and processing of specifying parameters (x, y, z, $\alpha$, $\beta$, and $\gamma$) of the position and posture of the robot at which collision with the obstacle is determined in a space between two postures included in the first cuboid is executed (step S39).

In such an embodiment as well, effects similar to those of a first embodiment are expected. Also, processing is shifted to detailed determination after extracting a first cuboid of the robot with respect to which collision is determined, without executing interference determination using a second cuboid, and therefore, an embodiment can be said to be appropriate for implementation.

As a result of using a second cuboid as an approximated body of an obstacle in this way, highly accurate interference determination can be easily executed. Specifically, there are cases where an obstacle cannot be approximated using a first cuboid with sufficient accuracy depending on the shape of the obstacle. As a result of such an obstacle being approximated by a second cuboid, highly accurate interference determination can be realized at high speed.

Note that, although the interference determination in step S37 is executed after generating the hierarchical structure (tree structure) constituted by first cuboids with respect to the robot in step S36, the hierarchical structure (tree structure) may be generated according to the result of interference determination with respect to a first cuboid of the robot. That is, a configuration may be adopted in which, after generating second cuboids of the initial posture, the intermediate posture, and the target posture in step S34, a first cuboid (first cuboid positioned at the top of the hierarchical structure (tree structure)) is generated as a total combined approximated body that includes all of the second cuboids, and processing for determining interference between the total combined approximated body and the approximated body of an obstacle is executed, without executing the processing in steps S35 and S36. Also, the configuration may be such that, only if interference is determined, a combined approximated body that includes at least two approximated bodies of a plurality of robot approximated bodies corresponding to the initial posture, the intermediate posture, and the target posture is generated as a partially combined approximated body, as a first cuboid in a layer one layer below (a first cuboid including adjacent intermediate postures that is generated in step S35, for example), and processing of determining interference with the obstacle is further executed. Also, the configuration may be such that first cuboids are generated so as to each include a relatively large number of robot approximated bodies, if interference is determined with respect to a first cuboid included in a relatively upper layer, the position and posture of a virtual robot are calculated while further reducing the separating width in a region between the two first cuboids included in the first cuboid with respect to which interference has been determined, irrespective of the method to be used, and the parameters of the position and posture may be calculated by determining interference between the virtual robot and the surrounding object for each position and posture. As a result of adopting such a configuration, the cost of generating a hierarchical structure (tree structure) can be suppressed, and the series of processing can be executed at a higher speed.

The embodiments described above are for the purpose of facilitating understanding of the present invention, and are not to be interpreted as limiting the present invention. Constituent elements of the embodiments and arrangement, materials, conditions, shapes and sizes thereof are not limited to those exemplified, and can be changed as appropriate. In addition, configurations described in different embodiments can be partially substituted or combined.

Also, the above embodiments can also be partially or wholly described as in the following supplementary remarks, but is not restricted to the following.

Supplementary Remark 1

An interference determination method of determining whether it is possible that a robot including a plurality of movable shafts interferes with a surrounding object that exists around the robot while the robot moves from a first position to a second position, using a computation device including an acquisition unit, storage unit, and a computation unit, wherein the computation unit executes:

storing robot data for approximating a shape of the robot as a polyhedron for each focused part into the storage unit;

storing data of a surrounding object approximated body that approximates to a shape of the surrounding object into the storage unit;

acquiring the first position and the second position using the acquisition unit;

setting at least one intermediate position on a motion path of movement from the first position to the second position;

generating a plurality of robot approximated bodies that approximate the shape of the robot at the first position, the second position, and the intermediate position as polyhedrons with respect to at least one focused part based on the robot data;

generating a plurality of first combined approximated bodies each constituted by combining at least two robot approximated bodies of the plurality of robot approximated bodies corresponding to the first position, the second position, and the intermediate position, with respect to the at least one focused part, and further generating a second combined approximated body constituted by combining at least two first combined approximated bodies; and determining whether the second combined approximated body interferes with the surrounding object approximated body.

Supplementary Remark 2

An interference determination system for determining whether it is possible that a robot including a plurality of movable shafts interferes with a surrounding object that exists around the robot while the robot moves from a first position to a second position, the interference determination system including:

a storage unit for storing robot data for approximating a shape of the robot as a polyhedron for each of a plurality of focused parts and data of surrounding object approximated body that approximates to a shape of the surrounding object;

an acquisition unit for acquiring the first position and the second position; and a computation unit configured to:

set at least one intermediate position on a motion path of movement from the first position to the second position;

generate a plurality of robot approximated bodies that approximate the shape of the robot at the first position, the second position, and the intermediate position as polyhedrons with respect to at least one focused part based on the robot data;

generate a plurality of first combined approximated bodies each constituted by combining at least two robot approximated bodies of the plurality of robot approximated bodies corresponding to the first position, the second position, and the intermediate position, with respect to the at least one focused part;

generate a second combined approximated body constituted by combining at least two first combined approximated bodies;

determine whether the second combined approximated body interferes with the surrounding object approximated body; and determine, if interference is determined, whether each of the plurality of first combined approximated bodies interferes with the surrounding object approximated body.

Supplementary Remark 3

An interference determination method of determining whether it is possible that a robot including a plurality of movable shafts interferes with a surrounding object that exists around the robot while the robot moves from a first position to a second position, using a computation device including an acquisition unit, storage unit, and a computation unit, wherein the computation unit executes:

storing robot data for approximating a shape of the robot as a polyhedron for each of a plurality of focused parts into the storage unit;

storing data of a surrounding object approximated body that approximates to a shape of the surrounding object into the storage unit;

acquiring the first position and the second position using the acquisition unit;

setting at least one intermediate position on a motion path of movement from the first position to the second position;

generating a plurality of robot approximated bodies that approximate the shape of the robot at the first position, the second position, and the intermediate position as polyhedrons with respect to each of the plurality of focused parts based on the robot data;

generating a total combined approximated body that is constituted by combining all the robot approximated bodies that has been generated;

determining whether the first combined approximated body interferes with the surrounding object approximated body;

generating, if interference has been determined, a plurality of partial combined approximated bodies that each constituted by combining at least two of the plurality of robot approximated bodies corresponding to the first position, the second position, and the intermediate position, with respect to each of the plurality of focused parts; and determining whether the plurality of second combined approximated bodies each interferes with the surrounding object approximated body.

Supplementary Remark 4

An interference determination system for determining whether it is possible that a robot including a plurality of movable shafts interferes with a surrounding object that exists around the robot while the robot moves from a first position to a second position, the interference determination system comprising:

a storage unit for storing robot data for approximating a shape of the robot as a polyhedron for each of a plurality of focused parts, and data of a surrounding object approximated body that approximates to a shape of the surrounding object;

an acquisition unit for acquiring the first position and the second position; and a computation unit configured to:

set at least one intermediate position on a motion path of movement from the first position to the second position;

generate a plurality of robot approximated bodies that approximate the shape of the robot at the first position, the second position, and the intermediate position as polyhedrons with respect to each of the plurality of focused parts based on the robot data;

generate a total combined approximated body that is constituted by combining all of the robot approximated bodies;

determining whether the total combined approximated body interferes with the surrounding object approximated body;

generating, if interference has been determined, a plurality of partial combined approximated bodies that each constituted by combining at least two of the plurality of robot approximated bodies corresponding to the first position, the second position, and the intermediate position, with respect to each of the plurality of focused parts; and determining whether the plurality of partial combined approximated bodies each interferes with the surrounding object approximated body.

Supplementary Remark 5

A computer program for determining whether it is possible that a robot including a plurality of movable shafts interferes with a surrounding object that exists around the robot while the robot moves from a first position to a second position, the computer program causes a computer to perform:

storing robot data for approximating a shape of the robot as a polyhedron for each of a plurality of focused parts;

storing data of a surrounding object approximated body that approximates to a shape of the surrounding object;

acquiring the first position and the second position;

setting at least one intermediate position on a motion path of movement from the first position to the second position;

generating a plurality of robot approximated bodies that approximate the shape of the robot at the first position, the second position, and the intermediate position as polyhedrons with respect to each of the plurality of focused parts based on the robot data;

generating a total combined approximated body that is constituted by combining all the robot approximated bodies that has been generated;

determining whether the total combined approximated body interferes with the surrounding object approximated body;

generating, if interference has been determined, a plurality of partial combined approximated bodies that each constituted by combining at least two of the plurality of robot approximated bodies corresponding to the first position, the second position, and the intermediate position, with respect to each of the plurality of focused parts; and determining whether the plurality of partial combined approximated bodies each interferes with the surrounding object approximated body.

The invention claimed is:

1. An interference determination method of determining whether it is possible that a robot including a plurality of shafts, configured to move, interferes with a surrounding object that exists around the robot while the robot moves from a first position to a second position, using a computation device comprising a processor configured with a program to perform operations comprising operation as an acquisition unit,
operation as a storage unit, and
operation as a computation unit configured to perform operations comprising:
- storing robot data for approximating a shape of the robot as a polyhedron for each of a plurality of focused parts of the robot by operation as the storage unit;
- storing data of a surrounding object approximated body that approximates a shape of the surrounding object by operation as the storage unit;
- acquiring the first position and the second position by operation as the acquisition unit;
- setting at least one intermediate position on a motion path of movement from the first position to the second position by operation as the computation unit;
- generating a plurality of robot approximated bodies as polyhedrons with respect to at least one of the plurality of focused parts based on the robot data, the plurality of robot approximated bodies comprising: a robot body approximating the shape of the robot at the first position; a robot body approximating the shape of the robot at the second position; and at least one robot body approximating the shape of the robot at the at least one intermediate position;
- generating a plurality of first combined approximated bodies each constituted by combining at least two of the plurality of robot approximated bodies, with respect to the at least one of the plurality of focused parts, and further generating a second combined approximated body constituted by combining at least two of the plurality of first combined approximated bodies; and
- determining whether the second combined approximated body interferes with the surrounding object approximated body.

2. The interference determination method according to claim 1, wherein the processor is configured with the program to perform operations such that operation as the computation unit further comprises:
- determining, in response to interference between the second combined approximated body and the surrounding object approximated body being determined, interference with the surrounding object approximated body using the first combined approximated bodies included in the second combined approximated body.

3. The interference determination method according to claim 1, wherein the processor is configured with the program to perform operations such that operation as the computation unit further comprises generating the plurality of first combined approximated bodies by combining two robot approximated bodies that are adjacent on the motion path.

4. The interference determination method according to claim 1, wherein the processor is configured with the program to perform operations such that operation as the computation unit further comprises generating the plurality of first combined approximated bodies by including a region between any adjacent robot approximated bodies of the plurality of robot approximated bodies, with respect to the at least one of the plurality of focused parts in at least one first combined approximated body.

5. The interference determination method according to claim 1, wherein the processor is configured with the program to perform operations such that operation as the computation unit further comprises generating the plurality of second combined approximated bodies by constituting the second combined approximated body by combining all of the robot approximated bodies that have been generated so as to approximate the shape of the robot as polyhedrons with respect to the at least one of the plurality of focused parts.

6. The interference determination method according to claim 2, wherein the processor is configured with the program to perform operations such that operation as the computation unit further comprises:
- extracting, in response to determining that a given first combined approximated body interferes with the surrounding object approximated body in determining whether the plurality of first combined approximated bodies each interfere with the surrounding object approximated body, a point at which the at least one of the plurality of focused parts collides with the surrounding object approximated body between two postures of the at least one of the plurality of focused parts respectively corresponding to two adjacent robot approximated bodies included in the first combined approximated body, and generating parameters regarding the position and a posture of the robot when the collision has occurred.

7. The interference determination method according to claim 1, wherein the processor is configured with the program to perform operations such that operation as the computation unit further comprises:
- storing data of a first surrounding object approximated body comprising an approximated body that approximates a shape of a first focused part comprising a portion of the surrounding object, and is smaller than the surrounding object approximated body, to the storage unit; and
- determining, in response to determining that the first or second combined approximated body interferes with the surrounding object approximated body, whether the first or second combined approximated body interferes with the first surrounding object approximated body.

8. The interference determination method according to claim 1, wherein the processor is configured to perform operations such that operation as the computation unit further comprises:
- constituting the surrounding object approximated body, the first combined approximated body, and the second combined approximated body, which comprise first cuboids by line segments that are parallel to three respective orthogonal axes of a first coordinate system; and
- determining, in response to determining that the first or second combined approximated body interferes with the surrounding object approximated body, whether the first or second combined approximated body interferes with a second cuboid approximated body, which comprises a second cuboid that approximates the surrounding object, is constituted by line segments that are parallel to respective axes of a second coordinate system obtained by rotating the first coordinate system by a given angle according to the shape of the surrounding object, and is smaller than the first cuboid.

9. An interference determination system for determining whether it is possible that a robot including a plurality of shafts, configured to move, interferes with a surrounding object that exists around the robot while the robot moves from a first position to a second position, the interference determination system comprising a processor configured with a program to perform operations comprising:

operation as a storage unit configured to store robot data for approximating a shape of the robot as a polyhedron for each of a plurality of focused parts of the robot and data of a surrounding object approximated body that approximates a shape of the surrounding object;

operation as an acquisition unit configured to acquire the first position and the second position; and operation as a computation unit configured to:
set at least one intermediate position on a motion path of movement from the first position to the second position;

generate a plurality of robot approximated bodies as polyhedrons with respect to at least one of the plurality of focused parts based on the robot data, the plurality of robot approximated bodies comprising: a robot body approximating the shape of the robot at the first positon; a robot body approximating the shape of the robot at the second position; and at least one robot body approximating the shape of the robot body at the at least one intermediate position;

generate a plurality of first combined approximated bodies, each of the plurality of the first combined approximated bodies constituted by combining at least two of the plurality of robot approximated bodies, with respect to the at least one of the plurality of focused parts;

generate a second combined approximated body constituted by combining at least two of the plurality of first combined approximated bodies; and determine whether the second combined approximated body interferes with the surrounding object approximated body.

10. The interference determination system according to claim 9, wherein the processor is configured with the program to perform operations such that operation as the computation unit further comprises determining, in response to determining that the second combined approximated body interferes with the surrounding object approximated body, interference with the surrounding object approximated body using the first combined approximated bodies included in the second combined approximated body.

11. The interference determination system according to claim 9, wherein the processor is configured with the program to perform operations such that operation as the computation unit comprises generating the plurality of first combined approximated bodies by constituting each of the plurality of first combined approximated bodies by combining two robot approximated bodies that are adjacent on the motion path.

12. The interference determination system according to claim 9, wherein the processor is configured with a program to perform operations such that operation as the computation unit comprises generating the plurality of first combined approximated bodies by including a region between any adjacent robot approximated bodies of the plurality of robot approximated bodies, with respect to the at least one of the plurality of focused parts, in at least one first combined approximated body.

13. The interference determination system according to claim 9, wherein processor configured with a program to perform operations such that operation as the computation unit comprises generating the plurality of second combined approximated bodies by constituting the second combined approximated body by combining all of the robot approximated bodies that have been generated so as to approximate the shape of the robot as polyhedrons with respect to the at least one of the plurality of focused parts.

14. The interference determination system according to claim 10, wherein the processor is configured with the program to perform operations such that operation as the computation device further comprises extracting, in response to determining that a given first combined approximated body interferes with the surrounding object approximated body in determining whether the plurality of first combined approximated bodies each interfere with the surrounding object approximated body, a point at which the at least one of the plurality of focused parts collides with the surrounding object approximated body between two postures of the at least one of the plurality of focused parts respectively corresponding to two adjacent robot approximated bodies included in the first combined approximated body, and generate parameters regarding the position and a posture of the robot when the collision has occurred.

15. The interference determination system according to claim 9, wherein the processor is configured with the program to perform operations such that:
operation as the storage unit comprises storing data of a first surrounding object approximated body comprising an approximated body that approximates a shape of a first focused part comprising a portion of the surrounding object, and is smaller than the surrounding object approximated body, and operation as the computation unit comprises determining, if it has been determined that the first or second combined approximated body interferes with the surrounding object approximated body, whether the first or second combined approximated body interferes with the first surrounding object approximated body.

16. The interference determination system according to claim 9, wherein
the surrounding object approximated body, the first combined approximated body, and the second combined approximated body comprise a first cuboids, which are constituted by line segments that are parallel to three respective orthogonal axes that constitute a first coordinate system, and the processor is configured with the program to perform operations such that operation as the computation unit comprises determining, in response to determining that the first or second combined approximated body interferes with the surrounding object approximated body, whether the first or second combined approximated body interferes with a second cuboid approximated body, which comprises a second cuboid that approximates the surrounding object, is constituted by line segments that are parallel to respective axes of a second coordinate system that is obtained by rotating the first coordinate system by a given angle according to the shape of the surrounding object, and is smaller than the surrounding object approximated body.

17. An interference determination method of determining whether it is possible that a robot including a plurality of shafts, configured to move, interferes with a surrounding object that exists around the robot while the robot moves from a first position to a second position, using a computation device comprising a processor configured with a program to perform operations comprising:
operation as an acquisition unit,
operation as a storage unit, and
operation as a computation unit, configured to perform operations comprising:
storing robot data for approximating a shape of the robot as a polyhedron for each of a plurality of focused parts of the robot into the storage unit;

storing data of a surrounding object approximated body that approximates a shape of the surrounding object into the storage unit;

acquiring the first position and the second position from operation as the acquisition unit;

setting at least one intermediate position on a motion path of movement from the first position to the second position;

generating a plurality of robot approximated bodies as polyhedrons with respect to each of the plurality of focused parts based on the robot data, the plurality of robot approximated bodies comprising: a robot body approximating the shape of the robot at the first position; a robot body approximating the shape of the robot at the second position; and at least one robot body approximating the shape of the robot body at the at least one intermediate position;

generating a total combined approximated body that is constituted by combining all the plurality of robot approximated bodies that have been generated;

determining whether the total combined approximated body interferes with the surrounding object approximated body;

generating, in response to interference being determined, a plurality of partial combined approximated bodies that are each constituted by combining at least two of the plurality of robot approximated bodies, with respect to each of the plurality of focused parts; and determining whether each of the plurality of partial combined approximated bodies interferes with the surrounding object approximated body.

18. An interference determination system for determining whether it is possible that a robot including a plurality of shafts, configured to move, interferes with a surrounding object that exists around the robot while the robot moves from a first position to a second position, the interference determination system comprising a processor configured with a program to perform operations comprising:

operation as a storage unit configured to store for storing robot data for approximating a shape of the robot as a polyhedron for each of a plurality of focused parts of the robot, and data of a surrounding object approximated body that approximates a shape of the surrounding object;

operation as an acquisition unit configured to acquire the first position and the second position; and operation as a computation unit configured to:
set at least one intermediate position on a motion path of movement from the first position to the second position;

generate a plurality of robot approximated bodies as polyhedrons with respect to each of the plurality of focused parts based on the robot data, the plurality of robot approximated bodies comprising: a robot body approximating the shape of the robot at the first positon; a robot body approximating the shape of the robot at the second position; and at least one robot body approximating the shape of the robot body at the at least one intermediate position;

generate a total combined approximated body that is constituted by combining all of the plurality of robot approximated bodies;

determine whether the total combined approximated body interferes with the surrounding object approximated body;

generate, in response to interference being determined, a plurality of partial combined approximated bodies that are each constituted by combining at least two of the plurality of robot approximated bodies, with respect to each of the plurality of focused parts; and determine whether each of the plurality of partial combined approximated bodies interferes with the surrounding object approximated body.

19. A non-transitory computer-readable storage medium storing a computer program for determining whether it is possible that a robot including a plurality of shafts, configured to move, interferes with a surrounding object that exists around the robot while the robot moves from a first position to a second position, the computer program causes a computer to perform operations comprising:

storing robot data for approximating a shape of the robot as a polyhedron for each of a plurality of focused parts of the robot;

storing data of a surrounding object approximated body that approximates a shape of the surrounding object;

acquiring the first position and the second position;

setting at least one intermediate position on a motion path of movement from the first position to the second position;

generating a plurality of robot approximated bodies as polyhedrons with respect to each of the plurality of focused parts based on the robot data, the plurality of robot approximated bodies comprising: a robot body approximating the shape of the robot at the first position; a robot body approximating the shape of the robot at the second position; and at least one robot body approximating the shape of the robot body at the at least one intermediate position;

generating a total combined approximated body that is constituted by combining all of the plurality of robot approximated bodies that have been generated;

determining whether the total combined approximated body interferes with the surrounding object approximated body;

generating, in response to interference being determined, a plurality of partial combined approximated bodies that are each constituted by combining at least two of the plurality of robot approximated bodies, with respect to each of the plurality of focused parts; and determining whether each of the plurality of partial combined approximated bodies interferes with the surrounding object approximated body.

* * * * *